United States Patent
Tadano

(10) Patent No.: US 9,740,575 B2
(45) Date of Patent: Aug. 22, 2017

(54) SYSTEM DESIGN METHOD, SYSTEM DESIGN APPARATUS, AND STORAGE MEDIUM STORING SYSTEM DESIGN PROGRAM, FOR ANALYZING FAILURE RESTORATION PROCEDURE

(71) Applicant: NEC Corporation, Minato-ku, Tokyo (JP)

(72) Inventor: Kumiko Tadano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 178 days.

(21) Appl. No.: 14/435,519

(22) PCT Filed: Sep. 17, 2013

(86) PCT No.: PCT/JP2013/005471
§ 371 (c)(1),
(2) Date: Apr. 14, 2015

(87) PCT Pub. No.: WO2014/061199
PCT Pub. Date: Apr. 24, 2014

(65) Prior Publication Data
US 2015/0301908 A1    Oct. 22, 2015

(30) Foreign Application Priority Data
Oct. 17, 2012  (JP) .................. 2012-230039

(51) Int. Cl.
*G06F 11/00* (2006.01)
*G06F 11/14* (2006.01)
*G06F 9/44* (2006.01)

(52) U.S. Cl.
CPC ........ *G06F 11/1469* (2013.01); *G06F 8/74* (2013.01); *G06F 11/1451* (2013.01); *G06F 2201/84* (2013.01)

(58) Field of Classification Search
CPC .................................. G06F 11/1469
See application file for complete search history.

(56) References Cited

U.S. PATENT DOCUMENTS 9,002,691 B2 *  4/2015  Richards ............ G05B 23/0248
                                                        703/13
9,088,615 B1 *  7/2015  Avlasov .................. H04L 63/20
(Continued)

FOREIGN PATENT DOCUMENTS

JP  2001-147951 A   5/2001
JP  2006-503368 A   4/2004
(Continued)

OTHER PUBLICATIONS

English translation of written opinion for PCT Application No. PCT/JP2013/005471.
(Continued)

*Primary Examiner* — Christopher McCarthy

(57) ABSTRACT

Provided are a system design method, a system design system, and a system design reform assistance program. A system design apparatus includes a unit for receiving an analysis model which represents a system failure restoration sequence, a unit for identifying, from the received analysis model, a minimum combination of component failure which does not satisfy either a restoration time requisite or a necessary cost requisite and a unit for outputting the identified minimum combination of component failure. The unit for identifying the minimum combination of component failure further includes a unit for estimating the restoration time of a system, and a unit for estimating the cost required for restoration of the system.

9 Claims, 18 Drawing Sheets

(56) References Cited

U.S. PATENT DOCUMENTS

| | | | |
|---|---|---|---|
| 2005/0209912 A1* | 9/2005 | Veeningen | G06Q 10/06 705/7.12 |
| 2008/0082345 A1* | 4/2008 | Greiner | G06Q 10/06 705/305 |
| 2012/0041747 A1* | 2/2012 | Aarts | G06F 17/5009 703/14 |
| 2012/0191503 A1* | 7/2012 | Heiman | G06Q 30/02 705/7.28 |
| 2012/0224057 A1* | 9/2012 | Gill | G06F 21/55 348/143 |
| 2014/0129272 A1* | 5/2014 | Hanley | G06Q 10/06311 705/7.13 |
| 2014/0257910 A1* | 9/2014 | Anders | G06Q 10/06313 705/7.23 |
| 2016/0323220 A1* | 11/2016 | Emejulu | H04L 51/12 |

FOREIGN PATENT DOCUMENTS

| | | |
|---|---|---|
| JP | 2005-316696 A | 11/2005 |
| JP | 2012-113582 A | 6/2012 |
| WO | 2012/056611 A1 | 5/2012 |
| WO | 2012/121005 A1 | 9/2012 |

OTHER PUBLICATIONS

International Search Report for PCT Application No. PCT/JP2013/005471, mailed on Nov. 12, 2013.

Kumiko Tadano, Jianwen Xiang, Yoshimaru Maeno, "Synthesizing Availability Model from Activity Diagrams for System Operations", Proceedings of the 73rd (2011) National Convention (1), Mar. 2, 2011, p. 1-263 to 1-264.

* cited by examiner

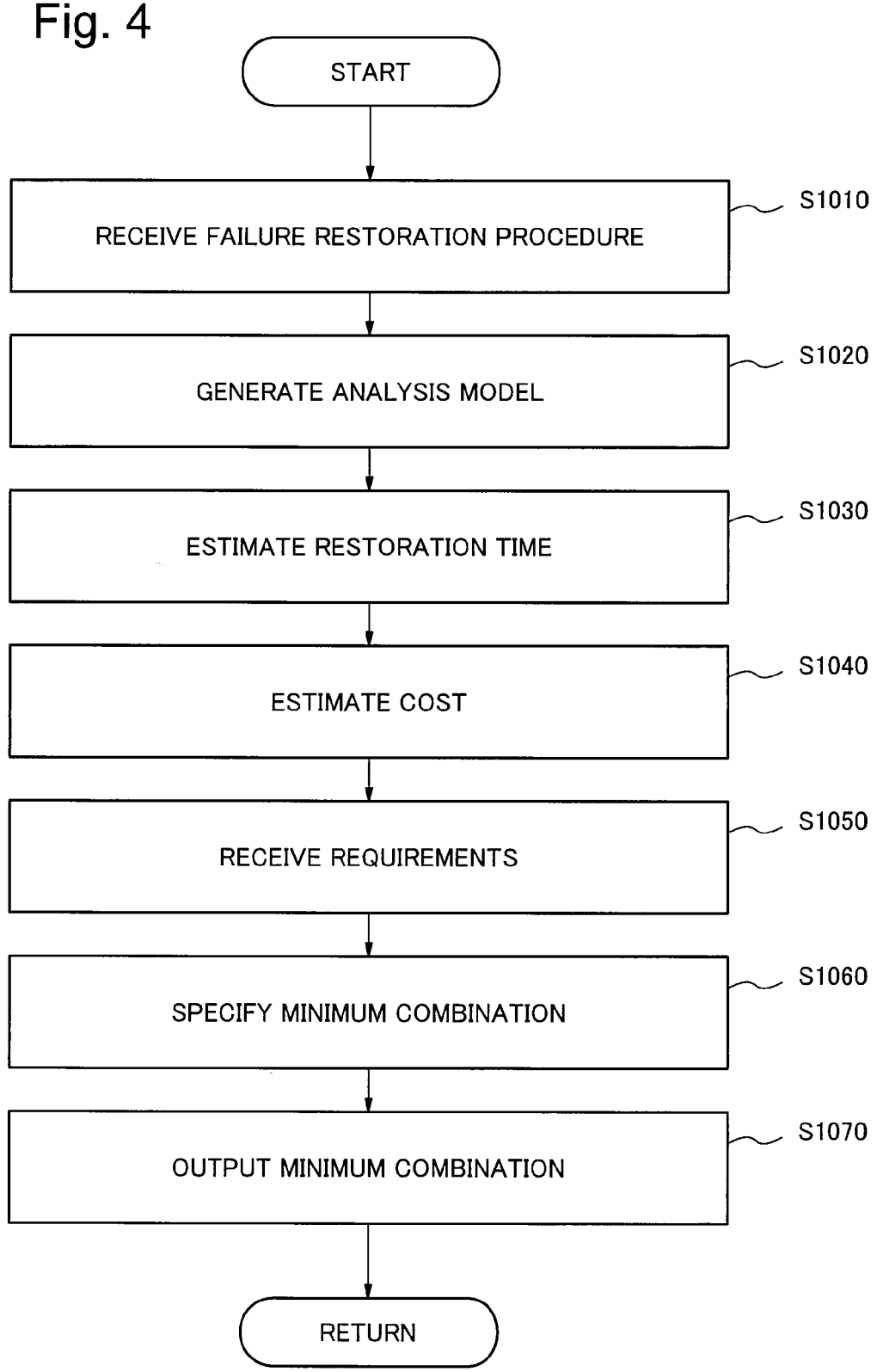

Fig. 5A

| INPUT AD MODULE | | | OUTPUT SRN MODEL MODULE | | | | |
|---|---|---|---|---|---|---|---|
| | | | | | | TRANSITION | |
| MODULE NAME | NOTATION EXAMPLE | CONTROL FLOW MODEL | RESTORATION OPERATION MODEL | SYSTEM STATE MODEL | NAME | TRANSITION RATE [1/H] (TRANSITION PROBABILITY) | PRIORITY | CARD FUNCTION |

| ACTIVITY | MODULE NAME | NOTATION EXAMPLE | CONTROL FLOW MODEL | RESTORATION OPERATION MODEL | SYSTEM STATE MODEL | NAME | TRANSITION RATE [1/H] (TRANSITION PROBABILITY) | PRIORITY | CARD FUNCTION |
|---|---|---|---|---|---|---|---|---|---|
| | (a) Initial Node module | (5A-F12) FIG. 12 | (5A-F13) FIG. 13 | n/a | n/a | $t_i$ | 1 | 2 | n/a |
| | (b) Decision Node module | (5A-F14) FIG. 14 | (5A-F15) FIG. 15 | n/a | (5A-F16) FIG. 16 | $T_{dec\,\theta}$ | $1/t_1$ | 0 | n/a |
| | | | | | | $t_{gyes\,\theta}$ | 1 | 1 | $g_{yes\,\theta}$ |
| | | | | | | $t_{gno\,\theta}$ | 1 | 1 | $g_{no\,\theta}$ |
| | | | | | | $t_{gfinishx}$ | 1 | 1 | $g_{finishx}$ |
| | | | | | | $t_{gbeforex}$ | 1 | 1 | $g_{beforex}$ |
| | (c) Action module | (5A-F17) FIG. 17 | (5A-F18) FIG. 18 | (5A-F19) FIG. 19 | n/a | $T_{gexecx}$ | $1/t_2$ | 0 | $g_{execx}$ |
| | | | | | | $t_{successx}$ | $p_1$ | 1 | n/a |
| | | | | | | $t_{failx}$ | $1-p_1$ | 1 | n/a |
| | | | | | | $t_{gyes/no\,\psi}$ | 1 | 1 | $g_{yes/no\,\psi}$ |
| | | | | | | $t_{greturnx}$ | 1 | 1 | $g_{returnx}$ |

Fig. 5B

| INPUT AD MODULE | | | OUTPUT SRN MODEL MODULE | | | | | |
|---|---|---|---|---|---|---|---|---|
| | MODULE NAME | NOTATION EXAMPLE | CONTROL FLOW MODEL | RESTORATION OPERATION MODEL | SYSTEM STATE MODEL | TRANSITION | | |
| | | | | | | NAME | TRANSITION RATE [1/H] (TRANSITION PROBABILITY) | PRIORITY | CARD FUNCTION |
| ACTIVITY | (d) Flow Final module | (5B-F20) FIG. 20 | (5B-F21) FIG. 21 | n/a | n/a | n/a | n/a | n/a | n/a |
| | (e) Activity- Final module | (5B-F22) FIG. 22 | (5B-F23) FIG. 23 | n/a | n/a | n/a | n/a | n/a | n/a |
| | (f) Control with condition module I | (5B-F24) FIG. 24 | n/a | n/a | (5B-F25) FIG. 25 | $t_{gopx}$ | 1 | 2 | $g_{opx}$ |
| Allocations | (g) Control with condition module II | (5B-F26) FIG. 26 | n/a | n/a | (5B-F27) FIG. 27 | $t_{gyes/no\psi}$ | 1 | 2 | $g_{yes/no}\psi$ |
| | (h) Prior module | (5B-F28) FIG. 28 | n/a | n/a | (5B-F29) FIG. 29 | $t_{gopx}$ | 1 | 2 | $g_{opx}$ |
| | | | | | | $t_{gopy}$ | 1 | 2 | $g_{opy}$ |

Fig. 16
1601 —◯ $P_{no\,\theta}$
1602 —◯ $P_{yes\,\theta}$
Fig. 17
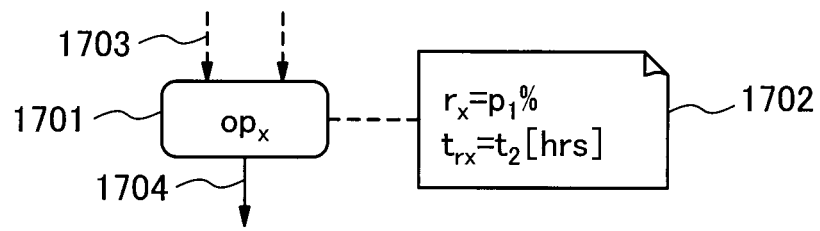
Fig. 18
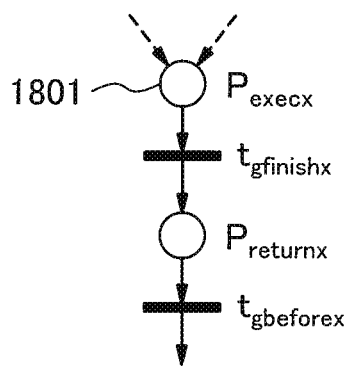

SYSTEM DESIGN METHOD, SYSTEM DESIGN APPARATUS, AND STORAGE MEDIUM STORING SYSTEM DESIGN PROGRAM, FOR ANALYZING FAILURE RESTORATION PROCEDURE

This application is a National Stage Entry of PCT/JP2013/005471 filed on Sep. 17, 2013, which claims priority from Japanese Patent Application 2012-230039 filed on Oct. 17, 2012, the contents of all of which are incorporated herein by reference, in their entirety.

TECHNICAL FIELD

The present invention relates to a technique for restoring from a failure that occurs in an information processing system.

BACKGROUND ART

When a large-scale disaster occurs, there is a possibility of failures occurring at the same time in many components in an information system (hereinafter, a failure that occurs in a component may be referred to as a component failure). In system design for this kind of restoration after disaster, a system designer designs an operation procedure (failure restoration procedure) for restoring a system from failures that occur at the same time in components, in such a way that a requirement for restoration time is satisfied. It is necessary to take the following two points into consideration to design this kind of failure restoration procedure.

Firstly, it needs to consider that the number of combinations of failures, which may occur at the same time in a large number of components, is extremely large. Therefore, evaluating all combinations of component failures, by means of tests in an actual environment, is not realistic. In order to cope with this problem, a model-based approach may be used, in which only values of basic parameters measured in the target system are used, to evaluate design of the failure restoration procedure, based on a model.

Secondly, it needs to consider that it is necessary to fulfill a customer requirement regarding restoration time within a limited budget. For example, in relation to failure restoration of a system, there is a case that prescribed restoration time is guaranteed based on a contract which is agreed with a customer, in advance. On the other hand, a countermeasure to shorten the failure restoration time takes costs. For example, from a viewpoint of a system configuration, the cost of equipment increases when component redundancy by means of hot standby, or the like, is implemented. As another example, from a viewpoint of human resources, personnel cost increases when a skilled system administrator is assigned. With these points, the cost becomes excessive when a system is designed to satisfy a requirement for restoration time about all combinations of component failures. However, a method for cost-effectively selecting a combination, of component failures, that satisfies a requirement for restoration time, is not obvious. From a viewpoint of cost-effectiveness, it is desirable to select a combination of component failures consisting of a minimum number of component failures, which does not satisfy a restoration time or necessary cost requirement, as a target for improvement(s) of the system design.

In order to identify a weak point in system design, for example, there is a known method for specifying minimum cut sets (MCSs) in a fault tree that represents failures (faults) of a system. MCSs are a minimum combination of basic events (for example, component failures) that may cause an undesirable top event (for example, a system failure).

An example of a method for effectively evaluating MCSs of a fault tree is disclosed in PTL 1. According to a technique disclosed in PTL 1, it is possible to reduce the amount of computation and to improve readability, in reliability analysis of a fault tree that includes a majority decision gate.

Note that, in PTL 2, the applicant of the present application discloses a technique for generating an availability model that estimates availability of an information system, when a plurality of operations are executed in accordance with a specific operation procedure.

CITATION LIST

Patent Literature

[PTL 1] Japanese Laid-open Patent Publication No. 2012-113582
[PTL 2] International Publication No. WO 2012/056611

SUMMARY OF INVENTION

Technical Problem

However, there is a problem that fault tree analysis as disclosed in PTL 1 is difficult to apply, in a case that there is complex dependency among target system states like a system failure restoration procedure. Specifically, the complex dependency is a system state change caused by carrying out a restoration operation during a failure restoration procedure, a dynamic change of the restoration operation to be carried out, associated with the system state change, a constraint on an execution order of the restoration operation, and the like. Therefore, it is difficult to apply the evaluation technique for MCSs of a fault tree, disclosed in PTL 1, to realize the objective of the invention of the present application.

The present invention takes the aforementioned problem into consideration, and an objective thereof is to provide a system design apparatus, a system design method, and a system design program that specify a minimum combination of component failures that does not satisfy a restoration time or necessary cost requirement.

Solution to Problem

A system design apparatus, that is an aspect of the present invention for achieving the above objective, includes means for receiving an analysis model that represents a failure restoration procedure for a system, means for specifying a minimum combination of component failures that does not satisfy restoration time or necessary cost requirement, from the received analysis model, and means for outputting the specified minimum combination of component failures, wherein the means for specifying the minimum combination of component failures includes means for estimating restoration time of the system, and means for estimating cost that is necessary for restoration of the system.

Furthermore, a system design method that is another aspect of the present invention is a system design method for receiving an analysis model that represents a failure restoration procedure for a system, specifying a minimum combination of component failures that does not satisfy a restoration time or necessary cost requirement, from the received analysis model, and outputting the specified minimum combination of component failures, wherein, when the minimum combination of component failures is specified, estimating restoration time of the system, and estimating cost that is necessary for restoration of the system.

Furthermore, a system design program that is another aspect of the present invention is a program for causing an information processing apparatus to function as means for receiving an analysis model that represents a failure restoration procedure for a system, means for specifying a minimum combination of component failures that does not satisfy a restoration time or necessary cost requirement, from the received analysis model, and means for outputting the specified minimum combination of component failures, wherein the means for specifying the minimum combination of component failures is configured for estimating the restoration time of the system, and means for estimating the cost that is necessary for restoration of the system.

Advantageous Effects of Invention

According to the present invention, it is possible to provide a system design apparatus, a system design method, and system design program, for specifying a minimum combination of component failures that does not satisfy a restoration time or necessary cost requirement.

BRIEF DESCRIPTION OF DRAWINGS

FIG. 4 is a flow chart illustrating an operation of the system design apparatus, according to the 2nd exemplary embodiment of the present invention.

FIG. 5A is a diagram illustrating an example of conversion rules for elements of a failure restoration procedure and elements of an analysis model, according to the 2nd exemplary embodiment of the present invention.

FIG. 5B is a diagram illustrating an example of conversion rules for elements of the failure restoration procedure and elements of the analysis model, according to the 2nd exemplary embodiment of the present invention.

FIG. 16 is a notation example for constituent elements that configure a system state model of the SRN model module corresponding to the "DecisionNode module", in the 2nd exemplary embodiment of the present invention.

FIG. 17 is a notation example illustrating a constituent element of an activity diagram corresponding to an "Action module", in the 2nd exemplary embodiment of the present invention.

FIG. 18 is a notation example for constituent elements that configure a control flow model of the SRN model module corresponding to the "Action module", in the 2nd exemplary embodiment of the present invention.

DESCRIPTION OF EMBODIMENTS

Figure 1:
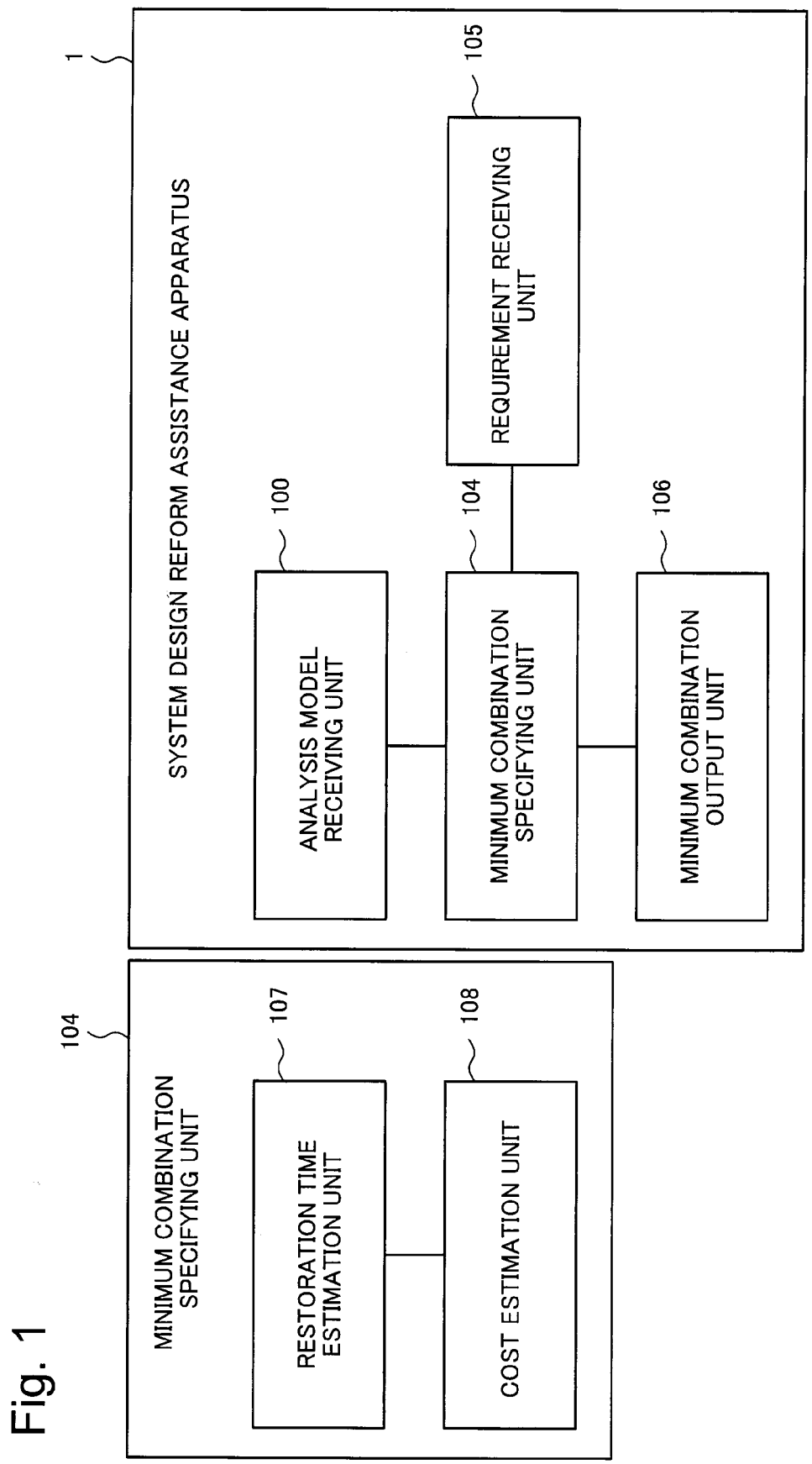
FIG. 1 is a block diagram illustrating an example of a system design apparatus, according to a 1st exemplary embodiment of the present invention.

This application claims priority rights on the basis of Japanese Patent Application 2012-230039 filed on Oct. 17, 2012, and the entirety of that disclosure is incorporated herein. In the present international application, for convenience of description, the expressions of the drawings of the related Japanese application have been broken down to a plurality of drawings, in order to satisfy the regulations for international applications. Accordingly, the present applicant has also adjusted the descriptions of the respective exemplary embodiments described hereinafter to correspond to the amended drawings. These measures have been made in consideration of language translations carried out when entering the national phase in each country, due to language differences, and do not include any new matter whatsoever.

Hereinafter, respective exemplary embodiments of a system design apparatus, a system design method, and a system design program according to the present invention are described with reference to FIGS. 1 to 30. The same reference signs are appended to corresponding portions in the respective drawings, and overlapping descriptions of these portions are omitted.

(About Terminology)

First, a failure restoration procedure in the respective exemplary embodiments hereinafter will be described. In the exemplary embodiments hereinafter, the failure restoration procedure is a procedure for restoring a component in which a failure has occurred. The failure restoration procedure is made up of sub-procedures that recover some of the components included in a system. Each sub-procedure includes a system management operation such as replace, restart, data restoration, and setting alteration. Each sub-procedure is written, in advance, in a document, a manual, or the like depending on a component to be restored.

When a plurality of component failures occur at the same time due to a disaster or the like, a system operator is responsible for restoring components in accordance with a failure restoration procedure. Sub-procedures, which are needed for restoration, are different depending on a combination of components, in which failures have occurred. Therefore, the system operator, first, accurately grasps the failures that have occurred in the system (that is, identifies components in which failures have occurred), and, next, determines sub-procedures to be executed for system restoration. Failure states of a component in the present application include not only a state that a component stops working (unusable) but also states such as the following. Specifically, such the failure states of a component also include states, that a component cannot be used normally, such as "some essential commands cannot be executed" and "some data necessary for the system disappear". Necessary sub-procedures included in the failure restoration procedure are different, depending on these different types of failure states.

Next, a minimum combination of component failures that cannot be tolerated (hereinafter, referred to as a "minimum failure combination" or a "minimum combination"), in the respective exemplary embodiments of the invention of the present application, is described. In the respective exemplary embodiments of the invention of the present application, a minimum failure combination is a minimum combination of component failures that occur at the same time, which does not satisfy requirements for the restoration time or the total cost necessary for failure restoration.

Hereinafter, an example is given. Assuming that there are four components A, B, C, and D in a system. Failures of these components are represented as FA, FB, FC, and FD, respectively. The restoration time requirement for this system is represented as $t_{req}$.

For example, combinations of component failures are assumed to be as follows with regard to a case that the restoration time exceeds $t_{req}$, when component failures occur at the same time. That is, specifically, those combinations are {FA, FB}, {FA, FB, FC}, {FA, FB, FD}, and {FA, FB, FC, FD}. In this case, the combination of component failures {FA, FB} is the minimum combination. The reason is that the number of component failures of {FA, FB} is the smallest among the four combinations given above. A value of the restoration time for the combination of the remaining three is certainly larger than a value of the restoration time for {FA, FB}.

1st Exemplary Embodiment

As illustrated in FIG. 1, functions of a system design apparatus 1 according to the 1st exemplary embodiment are realized by an information processing apparatus.

(Configuration)

The system design apparatus 1 is, for example, configured with a computer system such as a server apparatus and a personal computer.

Figure 30:
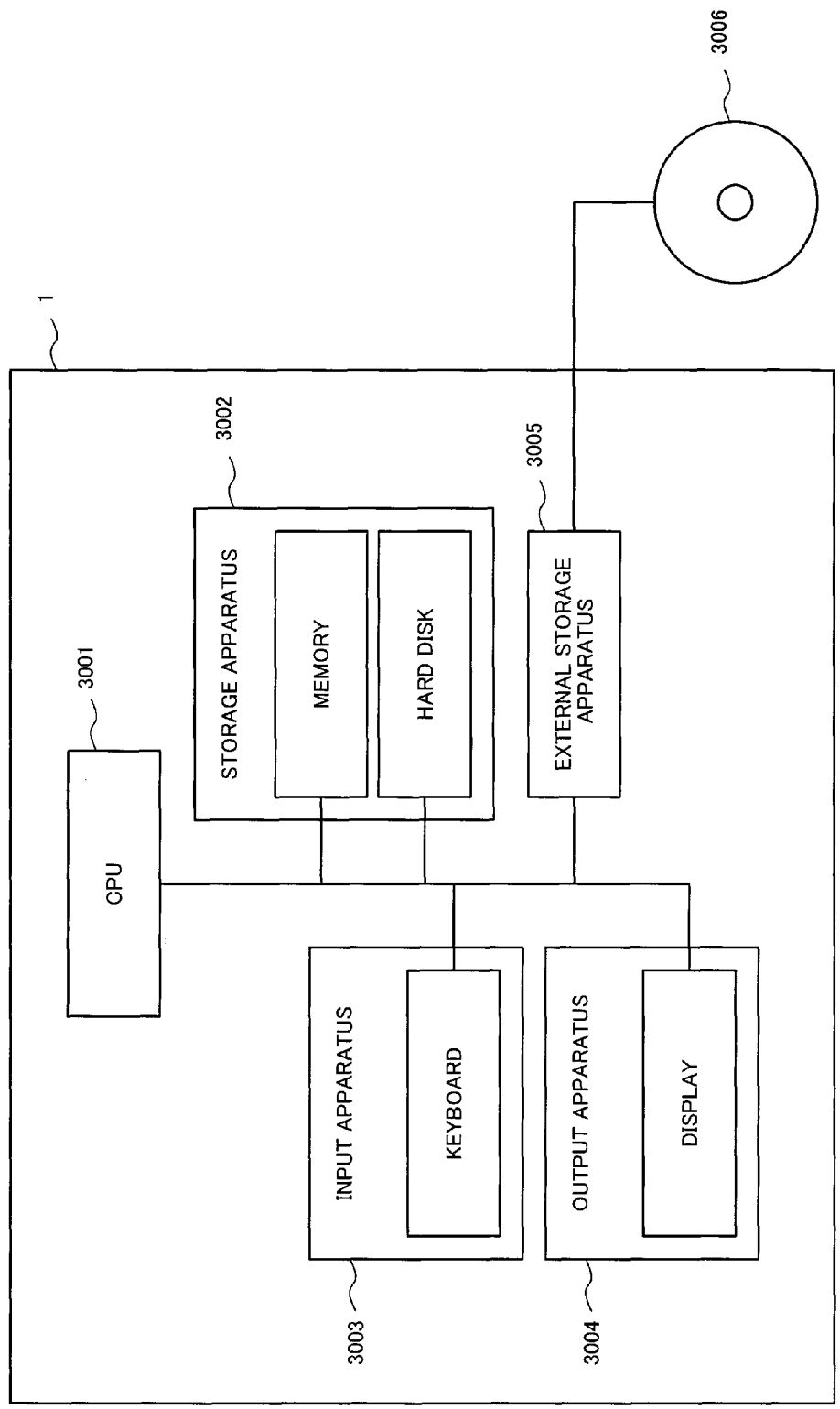
FIG. 30 is a hardware configuration diagram of the system design apparatus, according to the 1st exemplary embodiment of the present invention.

The system design apparatus 1 includes a central processing unit 3001 (CPU) and a storage apparatus 3002 (a memory and a hard disk drive apparatus (HDD)), illustrated in FIG. 30. Furthermore, the system design apparatus 1 includes an input apparatus 3003 (a keyboard in the present exemplary embodiment), an output apparatus 3004 (a display in the present exemplary embodiment), and the like. The system design apparatus 1 may be configured to realize functions described hereinafter, by the CPU executing a program stored in the storage apparatus. Note that it may be configured that the program is stored in a storage medium 3006, and read by an external storage apparatus 3005.

(Function)

FIG. 1 is a block diagram illustrating functions of the system design apparatus 1. The functions of the system design 1 include an analysis model receiving unit (analysis model receiving means) 100, a minimum combination specifying unit (minimum combination specifying means) 104, a requirement receiving unit 105, and a minimum combination output unit (minimum combination specifying means) 106. Furthermore, the minimum combination output unit 104 includes a restoration time estimation unit (restoration time estimation means) 107 and a cost estimation unit (cost estimation means) 108.

The analysis model receiving unit 100 receives an analysis model with which failure restoration time is evaluated based on design of a failure restoration procedure. In the present exemplary embodiment, the analysis model is a model such as the following. That is, the analysis model is a model that can represent the current system state, such as in which portion (component) of the system a failure occurs, and which portion is operating normally. Further, the analysis model is a model that can represent a parameter representing a feature such as time required to execute each restoration operation and a success rate. Furthermore, the analysis model is a model that can represent a change in a state of at least part of the system caused by execution of each restoration operation during the failure restoration procedure. Furthermore, the analysis model is a model that can represent a control flow of the failure restoration procedure that expresses a change for the restoration operation to be executed, associated with the change in the state of part of the system, and a constraint on an execution order of the restoration operations. In addition, in the present exemplary embodiment, the analysis model is a state transition model in which a state transition occurs based on a specific probability distribution. In the present exemplary embodiment, for example, a "Stochastic Reward Nets" (hereinafter, referred to as SRN) model is adopted as this kind of state transition model. Note that the state transition model may be selected arbitrarily and properly, and a different state transition model may also be adopted in the present exemplary embodiment, without being limited to an SRN model.

The requirement receiving unit 105 receives and stores restoration time and cost requirements that a system designer or the like inputs, in advance, using the input apparatus or the like.

The minimum combination specifying unit 104 uses the restoration time estimation unit 107 to estimate restoration time for each combination of component failures. The minimum combination specifying unit 104 uses the cost estimation unit 108 to estimate cost from the estimated restoration time. From the estimated restoration time and cost, the minimum combination specifying unit 104 specifies a minimum combination of component failures that does not satisfy the restoration time or cost requirement received by the requirement receiving unit 105.

The aforementioned restoration time estimation unit 107 estimates restoration time by solving the analysis model received in the requirement receiving unit 105, with regard to each combination of component failures. For example, when failures of components X and Y are restored based on a restoration procedure A, the restoration time for the procedure is estimated in such a way, that restoration is performed within five hours at a probability of 99%.

The cost estimation unit 108 uses a specific computation equation to estimate cost, based on the restoration time estimated by the restoration time estimation unit 107. The computation equation includes, for example, initial expense for constructing a disaster restoration system, personnel cost per hour for implementing the failure restoration procedure, downtime cost per unit time when a failure occurs, and the like. For example, when the failures of components X and Y are restored based on the restoration procedure A, cost, such as 10 million yen, is displayed as necessary cost.

The minimum combination output unit 106 presents the minimum combination specified by the minimum combination specifying unit 104. For example, the minimum combination output unit 106 may display "{component A, component C, component F} and {component A, component D, component G}" or the like on the screen.

(Operation)

Next, the operation of the aforementioned system design apparatus 1 is described with reference to FIG. 2.

Figure 2:
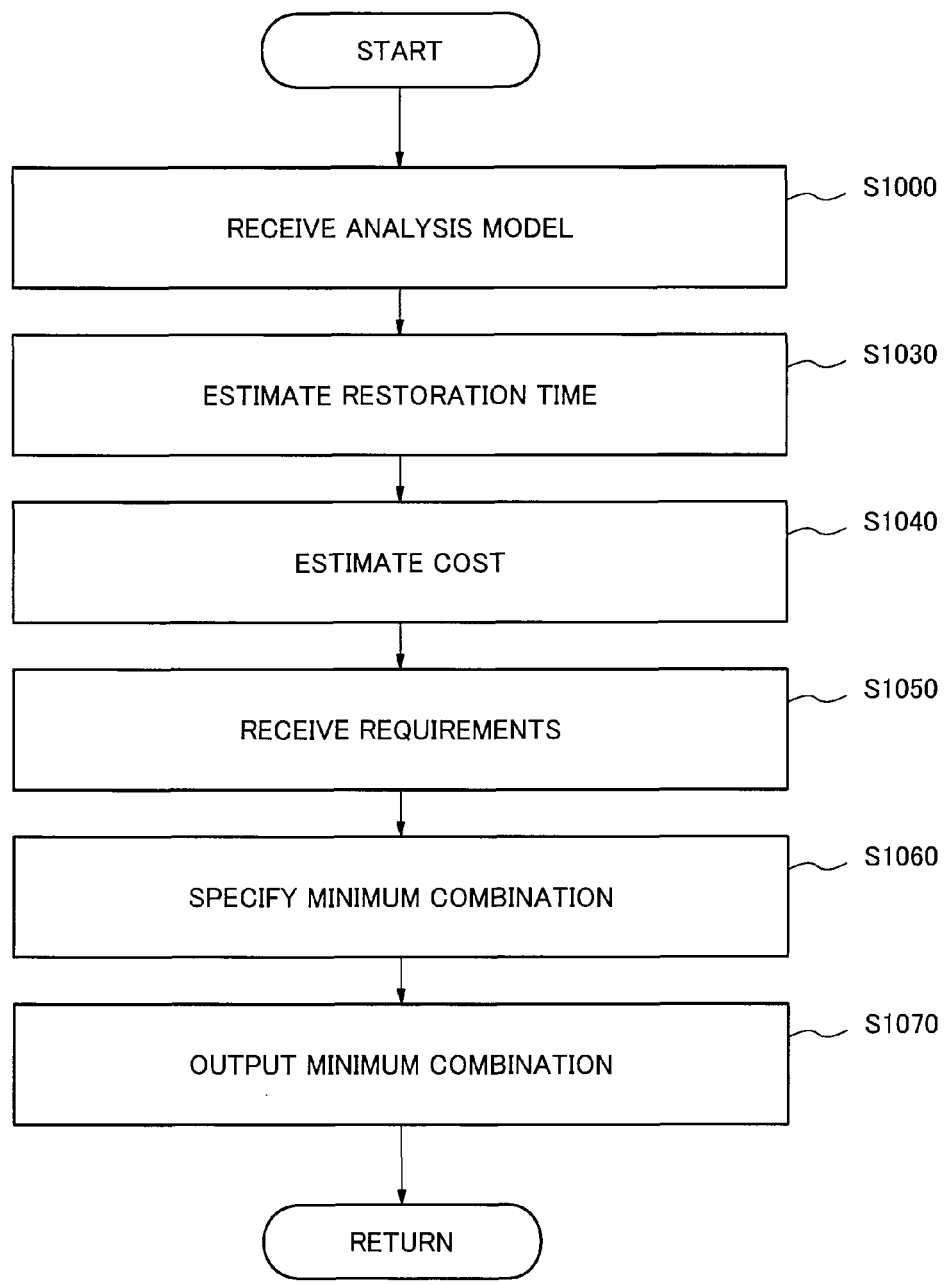
FIG. 2 is a flow chart illustrating an operation of the system design apparatus, according to the 1st exemplary embodiment of the present invention.

First, the system design apparatus 1 receives an analysis model representing a failure restoration procedure to be evaluated, from a system designer (step S1000 illustrated in FIG. 2). For example, when the analysis model is an SRN model, the system design apparatus 1 may receive the analysis model described based on an existing notation of analysis tool such as "Stochastic Petri Net Package" (hereinafter, referred to as SPNP).

Next, the system design apparatus 1 estimates restoration time for all combinations of component failures by solving the analysis model received in step S1000 (step S1030 illustrated in FIG. 2). For example, when the received model is an SRN model, the system design apparatus 1 uses an existing analysis tool such as SPNP to solve the analysis model. In this case, for example, in order to alter a combination of component failures, initial positions of one or more tokens (an initial distribution of tokens is generally referred to as an initial marking) representing a state of each portion of the system in an SRN model are altered. The restoration time is calculated as time from a state representing "start of a failure restoration procedure", to transition to a state representing "complete restoration" in the model.

Next, the system design apparatus 1 estimates cost based on the restoration time estimated in step S1030 (step S1040 illustrated in FIG. 2). The system design apparatus 1 proposed in the present exemplary embodiment uses a value of the estimated restoration time and a value of a parameter relating to the cost, to calculate a total cost $C_{total}$. The restoration time is represented as TTR, for example. The following parameters are used as parameters relating to the cost. That is, specifically, personnel cost $C_{recv}$ for failure restoration per unit time, education cost $C_{train}$ for a system operator who executes a restoration operation, facility investment $C_{initial}$ for executing a failure restoration procedure, excess time $t_{violation}$ of exceeding the restoration time requirement, and down time cost D per unit time, are used as parameters. The system design apparatus 1 calculates the total cost $C_{total}$ in accordance with the following equation.

$$C_{total} = D \times t_{violation} + C_{recv} \times TTR + C_{train} + C_{initial}$$

Note that, in the flowchart exemplified in FIG. 2, after obtaining the restoration time for all combinations of component failures in step S1030, the system design apparatus 1 obtains the cost for all combinations of component failures in step S1040. Without being limited to the above, the system design apparatus 1 may repeat estimation of the restoration time and estimation of the cost for each combination of component failures.

Next, the system design apparatus 1 receives restoration time and cost requirements from a system designer or the like (step S1050 illustrated in FIG. 2). For example, the restoration time requirement may be set to be such like "three hours", and the total cost requirement may be set to be such like "30 million yen". These values are dependent upon the system.

Next, the system design apparatus 1 specifies the minimum combination of component failures based on the restoration time and cost requirements obtained in step S1050, the restoration time obtained in step 1030, and the cost obtained in step 1040 (step S1060 illustrated in FIG. 2). Specifically, among the combinations of component failures, that do not satisfy requirements obtained in step S1050, a combination having the lowest number of component failures is specified as the minimum combination.

Next, the system design apparatus 1 outputs the minimum combination obtained in step S1060, to the display or the like (step S1070 illustrated in FIG. 2).

Effect According to 1st Exemplary Embodiment

According to the aforementioned 1st exemplary embodiment of the present invention, in analysis of failures that occur at the same time in a plurality of components configuring an information processing system, the minimum combination of component failures, that does not satisfy requirements for the restoration time or the necessary cost for the failures, is specified. By using the system design apparatus according to the 1st exemplary embodiment of the present invention, a system designer is able to quantitatively comprehend the limitations of the current design, and to effectively improve the system design with regard to failure restoration. Furthermore, the system designer is able to easily determine satisfiability of the system failure restoration requirements (restoration time, cost, and the like) requested by a customer.

2nd Exemplary Embodiment

Figure 3:
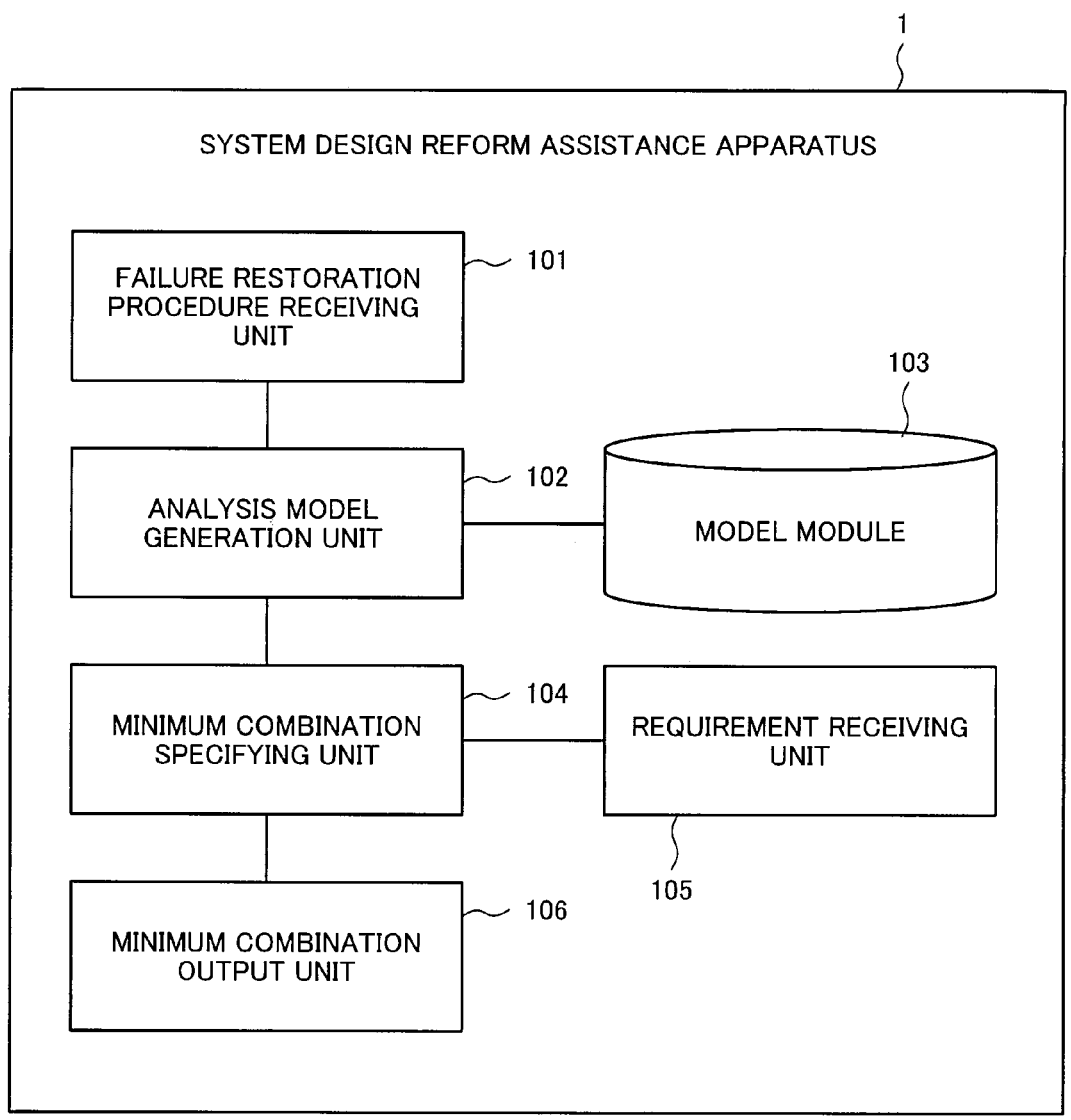
FIG. 3 is a block diagram illustrating an example of a system design apparatus, according to a 2nd exemplary embodiment of the present invention.

Next, a system design apparatus according to a 2nd exemplary embodiment of the present invention is described with reference to FIG. 3. In FIG. 3, the same reference signs are appended to portions that correspond to FIG. 1, and descriptions of these portions are omitted.

The system design apparatus according to the 2nd exemplary embodiment further includes, with respect to the system design apparatus 1 according to the 1st exemplary embodiment, a configuration that automatically generates an analysis model from a failure restoration procedure. Hereinafter, this configuration is mainly described.

(Function)

FIG. 3 is a block diagram illustrating functions of the system design apparatus 1 according to the 2nd exemplary embodiment. The functions of the system design apparatus 1 according to the 2nd exemplary embodiment include a failure restoration procedure receiving unit 101 and an analysis model generation unit 102 in addition to the functions (the minimum combination specifying unit 104, the requirement receiving unit 105, and the minimum combination output unit 106) of the system design apparatus 1 according to the 1st exemplary embodiment. Furthermore, the functions of the system design apparatus 1 according to the 2nd exemplary embodiment may not include the analysis model receiving unit 100 among the functions of the system design apparatus 1 according to the 1st exemplary embodiment.

The failure restoration procedure receiving unit 101 receives a failure restoration procedure to be evaluated, from a system designer. The system designer inputs a failure restoration procedure that is designed using an activity diagram in "Systems Modeling Language" (hereinafter, referred to as SysML), for example.

The analysis model generation unit 102 generates an analysis model from the received failure restoration procedure. For example, the analysis model generation unit 102 converts the activity diagram into an SRN-format analysis model based on predefined conversion rules between activity diagrams and SRN, stored in advance in a model module database 103. The configuration other than this is the same as the configuration according to the 1st exemplary embodiment of the present invention illustrated in FIG. 1.

(Operation)

Next, an operation of the aforementioned system design apparatus 1 is described with reference to FIG. 4. FIG. 4 is a flow chart illustrating an overview of the operation of the system design apparatus according to the 2nd exemplary embodiment of the present invention.

Figure 6:
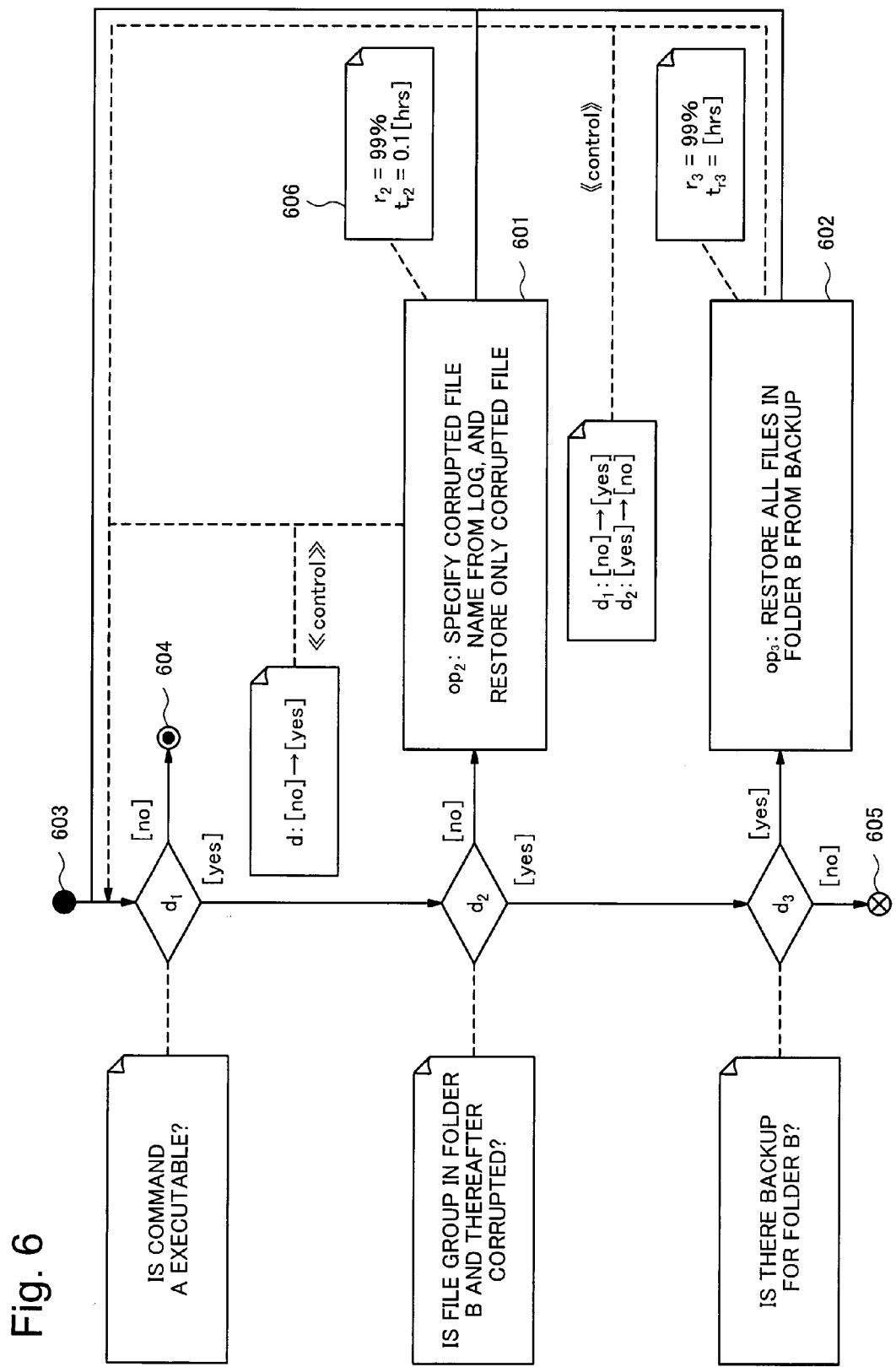
FIG. 6 is a diagram illustrating an example of an activity diagram representing information about failure restoration procedure, according to the 2nd exemplary embodiment of the present invention.

First, the system design apparatus 1 according to the present exemplary embodiment receives a failure restoration procedure from a system designer (step S1010 illustrated in FIG. 4). In the present exemplary embodiment, for example, the system designer uses an activity diagram to write a failure restoration procedure. FIGS. 5A, 5B, and 12 to 29 depict notation examples of an activity diagram, and FIG. 6 depicts an example of an activity diagram that represents a failure restoration procedure. Note that tables of FIGS. 5A and 5B include reference numbers for constituent elements of a model, and drawing numbers illustrating the constituent elements of the model corresponding to the reference number.

In the present exemplary embodiment, five types of nodes are used to represent features of a failure restoration procedure. Hereinafter, each of these nodes is described.

<Action>: An "Action", represented by a rectangle, represents one operation (for example, replace, restart, data restoration, and the like) of the failure restoration procedure (reference number 5A-F17 illustrated in FIG. 5A (1701 illustrated in FIG. 17), 601 and 602 illustrated in FIG. 6, and the like).

<DecisionNode>: A "DecisionNode", represented by a rhombus, represents a conditional branch in which the output thereof ("yes" or "no") is decided depending on a state of a specific system component (reference number 5A-F14 illustrated in FIG. 5A (1401 illustrated in FIG. 14), d1, d2, and d3 illustrated in FIG. 6, and the like). Note that the state of a specific system component is, for example, a state such as whether a component is operating normally or is having a failure (fault), and whether a backup file is present or is not present. The system designer decides which output of "yes" and "no" corresponds to a failure state of a component, as information necessary for composition of an analysis model. The state of a component changes when execution of a specific restoration operation is successful. However, since there is also a failure that is unrecoverable, this kind of restoration operation does not always exist.

<InitialNode>: An "InitialNode", represented by a circle (black circle), represents a starting point of a control flow for a failure restoration procedure (reference number 5A-F12 illustrated in FIG. 5A (1201 in FIG. 12) and 603 illustrated in FIG. 6).

<ActivityFinal>: An "ActivityFinal", represented by a circle having a black dot therein, represents an end point of a control flow, in a state that the system is completely restored (reference number 5B-F22 illustrated in FIG. 5B (2201 in FIG. 22) and 604 illustrated in FIG. 6). Note that a state that the system is completely restored is, for example, a state such as when a broken-down database server is restored having the latest data.

<FlowFinal>: A "FlowFinal", represented by a circle having a cross therein, represents an end point of a control flow, in a state that the system still has a partial failure (fault) (reference number 5B-F20 illustrated in FIG. 5B (2001 in FIG. 20) and 605 illustrated in FIG. 6). Note that the state that the system still has a partial failure is, for example, a state such as when a broken-down database server is restored with corrupted data.

A restoration operation success rate $r_x$ and a restoration operation execution time $t_{r_x}$ are defined as parameters with respect to one "Action" $op_x$ (1702 in FIG. 17, 606 in FIG. 6, and the like). Time $t_{c\theta}$ for completing a check of a state being completed is defined as a parameter with respect to one "DecisionNode" $d_\theta$ (1402 in FIG. 14). Values of these parameters are designated in a note associated with a node, and are used as a transition rate (transition probability) of a composed SRN model.

A target system component of each restoration operation is designated using an "allocation" of the SysML. The "allocation" of the SysML represents various types of relationship among SysML elements such as an "Action" and a "DecisionNode". In the present exemplary embodiment, in order to represent relationship of a failure restoration procedure, the following two stereotypes are defined with regard to an "allocation" between an "Action" and a "DecisionNode".

Figure 24:
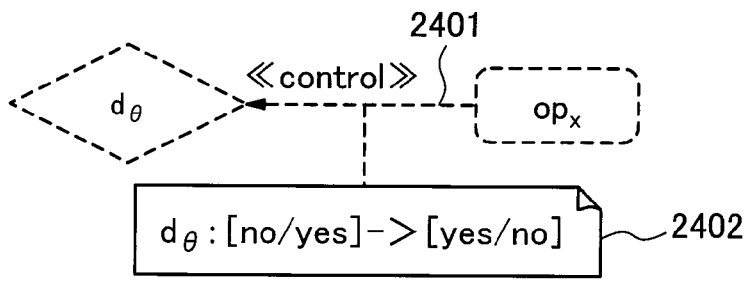
FIG. 24 is a notation example illustrating constituent elements of an activity diagram corresponding to a "Control with condition module I", in the 2nd exemplary embodiment of the present invention.
Figure 25:
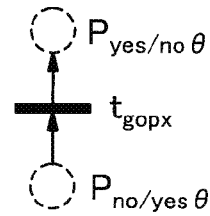
FIG. 25 is a notation example for constituent elements that configure a system state model of the SRN model module corresponding to the "Control with condition module I", in the 2nd exemplary embodiment of the present invention.
Figure 26:
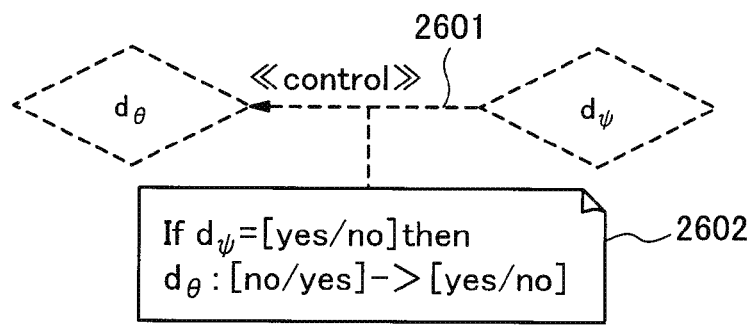
FIG. 26 is a notation example illustrating constituent elements of an activity diagram corresponding to a "Control with condition module II", in the 2nd exemplary embodiment of the present invention.
Figure 27:
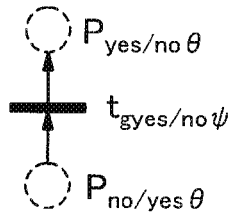
FIG. 27 is a notation example for constituent elements that configure a system state model of the SRN model module corresponding to the "Control with condition module II", in the 2nd exemplary embodiment of the present invention.
Figure 28:
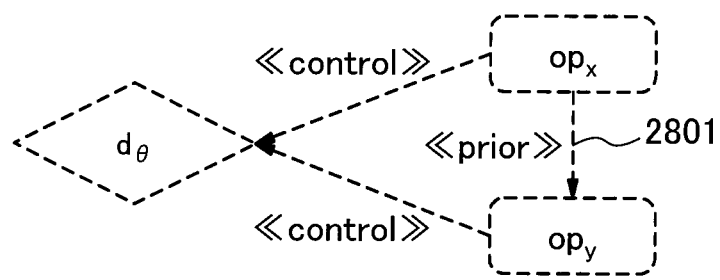
FIG. 28 is a notation example illustrating constituent elements of an activity diagram corresponding to a "Prior module", in the 2nd exemplary embodiment of the present invention.
Figure 29:
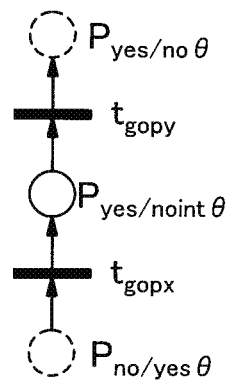
FIG. 29 is a notation example for constituent elements that configure a system state model of the SRN model module corresponding to the "Prior module", in the 2nd exemplary embodiment of the present invention.

<control with condition>: An "allocation" having this stereotype, from an "Action" representing an certain operation $op_x$, to a "DecisionNode" representing a certain conditional branch $d_\theta$, means that the successful execution of $op_x$ changes the output of $d_\theta$ (reference number 5B-F24 illustrated in FIG. 5B (2401 in FIG. 24), 609 illustrated in FIG. 6, and the like). A content of the change of the output of a "DecisionNode" caused by the successful execution of an "Action" is described as a condition in a note associated with the "allocation" (2402 in FIG. 24, 610 illustrated in FIG. 6, and the like). On the other hand, an "allocation" having this stereotype, from a "DecisionNode" $d_\psi$, to a "DecisionNode" $d_\theta$, means that the output of $d_\theta$ changes in accordance with the output of $d_\psi$, (reference number 5B-F26 illustrated in FIG. 5B (2601 in FIG. 26)). Similarly, a content of the change caused by $d_\psi$ is described as a condition in a note associated with the "allocation" (2602 in FIG. 26). Note that this "allocation" may be written as <<control>> in the drawings of the present application.

<prior>: Failure restoration procedure operations sometimes have dependency upon the execution order. For example, a case that, in order to recover from a failure, it is necessary for a specific operation to succeed prior to a success of different specific operation, corresponds to this kind of dependency on the execution order. In the present exemplary embodiment, a <prior> is introduced as a stereotype expressing this kind of dependency, so that a system designer can clearly describe these dependency constraints. It is assumed that there are two "allocation"s having a stereotype of <control with condition> from two "Actions" representing two operations $op_x$ and $op_y$, to one "DecisionNode" $d_\theta$. In this case, the "allocation" having a stereotype of "prior" from $op_x$ to $op_y$ means that, in order for the output of $d_\theta$ to be changed, the successful execution of $op_x$ is necessary prior to the successful execution of $op_y$ (reference number 5B-F28 in FIG. 5B (2801 in FIG. 28)). Note that this "allocation" may be written as <<prior>> in the drawings of the present application.

Next, the system design apparatus 1 generates an analysis model from the failure restoration procedure received in step S1010 (step S1020 illustrated in FIG. 4). In the present exemplary embodiment, the analysis model is expressed using an SRN model.

For example, as illustrated in FIG. 5 (FIGS. 5A and 5B), the SRN model generated in step S1020 is configured with three types of sub-models of one or more system state models, one control flow model, and one or more restoration operation models. The control flow model represents a control flow for the failure restoration procedure being input. Each restoration operation model represents one restoration operation. Each system state model represents a state (operating normally or having a failure (fault)) of part of the target system.

In the present exemplary embodiment, the analysis model generation unit 102 composes an SRN model, based on a conversion rule between a component of an activity diagram (hereinafter, referred to as an AD module) and a component of an SRN model (hereinafter, referred to as an SRN module), in accordance with the following three sub-steps. Note that FIGS. 5A and 5B depict an example of the conversion rule for elements of a failure restoration procedure and elements of an analysis model.

In sub-step 1, the analysis model generation unit 102 divides the received activity diagram into AD modules. In sub-step 2, the analysis model generation unit 102 converts the AD modules into SRN model modules. In sub-step 3, the analysis model generation unit 102 integrates the converted SRN model modules into one SRN model. Hereinafter, each of the sub-steps is described.

Sub-step 1: In sub-step 1, the analysis model generation unit 102 divides the input activity diagram into AD modules configured with a node and an output edge, as illustrated in the third column of the tables illustrated in FIGS. 5A and 5B. An edge that is input to each node of an AD module represents an output edge from the immediately preceding AD module (1403 in FIG. 14, 1703 in FIG. 17, and the like). Edges between nodes in the AD modules (f) "Control with Condition module I", (g) "Control with Condition module II", and (h) "Prior Module" in FIG. 5B represent an aforementioned "allocation". The AD modules (a) "InitialNode module", (b) "DecisionNode module", and (c) "Action module" in FIG. 5A include the aforementioned respective nodes and edges to the next AD modules. Similarly, the (d) "FlowFinal module" and (e) "ActivityFinal module" in FIG. 5B include the aforementioned respective nodes and edges to the next AD modules. The AD modules (f) "Control with Condition module I", (g) "Control with Condition module II", and (h) "Prior Module" in FIG. 5B include only "allocation"s. The number of input edges for the AD module (a) "InitialNode module" in FIG. 5A is fixed at 0. The number of input edges for the AD modules (b) "DecisionNode module" and (c) "Action module" in FIG. 5A depends on the control flow for the input activity diagram. Similarly, the number of input edges for the AD modules (d) "FlowFinal module" and (e) "ActivityFinal module" in FIG. 5B depends on the control flow for the input activity diagram. Note that, hereinafter, the symbols (a) to (h) are used to refer to each AD module illustrated in FIGS. 5A and 5B.

Sub-step 2: In sub-step 2, the analysis model generation unit 102 converts each of the AD modules into the corresponding SRN model module, as illustrated in the fourth to sixth columns of the tables in FIGS. 5A and 5B.

Sub-step 3: In sub-step 3, the analysis model generation unit 102 integrates the SRN model modules converted in sub-step 2, into one SRN model for analysis, in accordance with connection relationship between the AD modules expressed in the original activity diagram of the conversion. An output arc of each converted SRN model module is connected to a "place" of an SRN model module converted from the AD module, which is a connection destination in the original activity diagram of the conversion. The "place" represents a state that can be adopted by the system in the SRN model.

When the AD module that is a connection destination in the original activity diagram of the conversion, is (b), (c), (d), or (e) in FIGS. 5A and 5B, the output arc is connected to each of the following "place"s. Specifically, when the AD module is (b), the output arc is connected to "place" $P_{pre\theta}$ (reference number 5A-F15 in FIG. 5A, 1501 in FIG. 15). Further, when the AD module is (c), the output arc is connected to $P_{execx}$ (reference number 5A-F18 in FIG. 5A, 1801 in FIG. 18). Furthermore, when the AD module is (d), the output arc is connected to $P_{unrecv\phi}$ (reference number 5B-F21 in FIG. 5B, 2101 in FIG. 21). Furthermore, when the AD module is (e), the output arc is connected to $P_{recv}$ (reference number 5B-F23 in FIG. 5B, 2301 in FIG. 23).

In FIGS. 5A and 5B, the following naming convention is adopted for a name of a guard function of a composed model. Specifically, when a transition has a guard function, a name of the transition includes the name of the guard function thereof as subscript characters (seventh column in the tables in FIGS. 5A and 5B). For example, for (b) "DecisionNode module" in FIG. 5A, a transition $t_{gyes\theta}$ has a guard function $g_{yes\theta}$. A name of each guard function begins with "g", and subscript characters thereof are a name of a "place" that enables firing of the transition which has the guard function, when a token is present (tenth column in the tables in FIGS. 5A and 5B). The transition represents a transition of a state in the system, and the guard function represents a condition under which a transition occurs. Furthermore, a "place", in which a token is present, represents the current state in the system.

Detail of the conversions (a) to (h) from AD modules to SRN model modules, illustrated in FIGS. 5A and 5B, is as follows.

Figure 12:
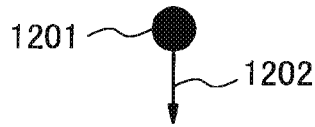
FIG. 12 is a notation example illustrating a constituent element of an activity diagram corresponding to an "InitialNode module", in the 2nd exemplary embodiment of the present invention.
Figure 13:
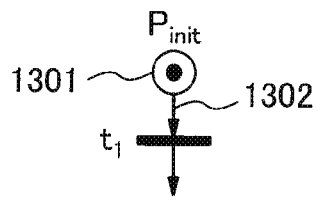
FIG. 13 is a notation example for constituent elements that configure a control flow model of a "Stochastic Reward Nets (SRN)" model module corresponding to the "InitialNode module", in the 2nd exemplary embodiment of the present invention.

First, the (a) "InitialNode Module" illustrated in FIG. 5A includes one "InitialNode" (reference number 5A-F12 in FIG. 5A (1201 in FIG. 12)), and one output edge (1202 in FIG. 12). The (a) "InitialNode Module" is converted into a starting "place" $P_{init}$ of a control flow model (reference number 5A-F13 in FIG. 5A (1301 in FIG. 13)), and one output edge from the "place" (1302 in FIG. 13).

Figure 14:
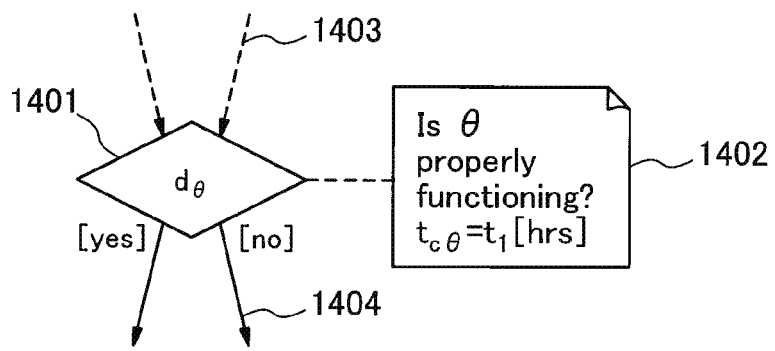
FIG. 14 is a notation example illustrating a constituent element of an activity diagram corresponding to a "DecisionNode module", in the 2nd exemplary embodiment of the present invention.
Figure 15:
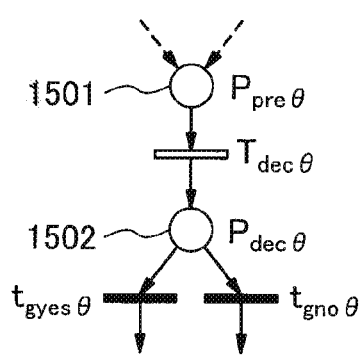
FIG. 15 is a notation example for constituent elements that configure a control flow model of the SRN model module corresponding to a "DecisionNode module", in the 2nd exemplary embodiment of the present invention.
Figure 19:
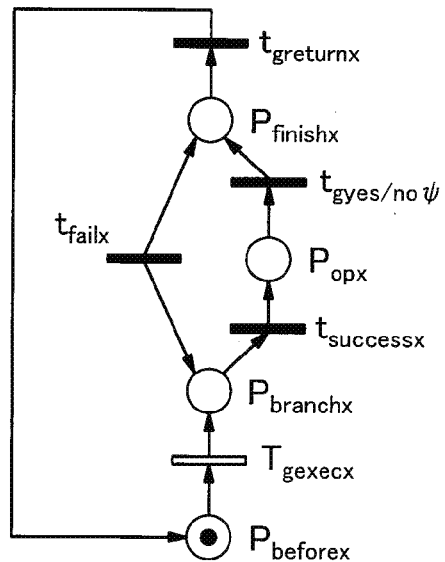
FIG. 19 is a notation example for constituent elements that configure a restoration operation model of the SRN model module corresponding to the "Action module", in the 2nd exemplary embodiment of the present invention.
Figure 20:
FIG. 20 is a notation example illustrating a constituent element of an activity diagram corresponding to a "FlowFinal module", in the 2nd exemplary embodiment of the present invention.
Figure 21:
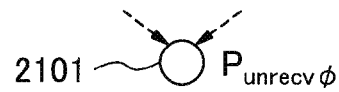
FIG. 21 is a notation example for a constituent element that configure a control flow model of the SRN model module corresponding to a "Flow module", in the 2nd exemplary embodiment of the present invention.
Figure 22:
FIG. 22 is a notation example illustrating a constituent element of an activity diagram corresponding to an "ActivityFinal module", in the 2nd exemplary embodiment of the present invention.
Figure 23:
FIG. 23 is a notation example for a constituent element that configure a control flow model of the SRN model module corresponding to the "ActivityFinal module", in the 2nd exemplary embodiment of the present invention.

Next, the (b) "DecisionNode Module" illustrated in FIG. 5A includes one "DecisionNode" (1401 in FIG. 14), and two output edges (1404 in FIG. 14). The (b) "DecisionNode Module" is converted into a control flow model and a system state model in the SRN model in accordance with (1) and (2) below.

(1) The "DecisionNode Module" is converted into "place"s ($P_{pre\theta}$, $P_{dec\theta}$, and the like) (1501 and 1502 in FIG. 15), transitions ($t_{gyes\theta}$, $t_{gno\theta}$, and the like), and arcs of the control flow model indicated by reference number 5A-F15 (FIG. 15) in FIG. 5A.

(2) The "DecisionNode Module" is converted into two "place"s ($P_{yes\theta}$ and $P_{no\theta}$) of the system state model indicated by reference number 5A-F16 (FIG. 16) in FIG. 5A (1601 and 1602 in FIG. 16).

First, the control flow model in the aforementioned (1) is described. When a token moves to the "place" $P_{pre\theta}$ from the immediately preceding (source of the transition) SRN model module converted from the AD module (a), (b), or (c) illustrated in FIG. 5A, the token moves to the "place" $P_{dec\theta}$ at a transition rate of $1/t_1$ [1/hour]. When an output of the "DecisionNode" $d_\theta$ is "yes" or "no", the respective transition $t_{gyes\theta}$ or $t_{gno\theta}$ fires, and the token moves to a "place" of an SRN model module that is converted from the next (destination of the transition) AD module. Next, the system state model in the aforementioned (2) is described. In order to represent two outputs (yes and no) of the "DecisionNode" $d_\theta$, the converted system state model has two "place"s $P_{yes\theta}$ and $P_{no\theta}$ that correspond to the two outputs (1601 and 1602 in FIG. 16). One token is present in either $P_{yes\theta}$ or $P_{no\theta}$. When the analysis model generation unit 102 executes model analysis for a plurality of combinations of component failures, the initial position (initial "place") of the token automatically changes. The transition of the token among these "place"s is decided by means of (f) or (g) as the "allocation" illustrated in FIG. 5B. With regard to the number of input arcs of $d_1$, when there is only one input arc,
an immediate transition $t_{g1}$, a timed transition $T_{dec\theta}$, and the "place" $P_{pre\theta}$ are integrated into one timed transition $T_{g1}$ [1/hr] having a transition rate of $1/t_1$. The reason for this is that the reachability graphs thereof are equal.

The (c) "Action module" illustrated in FIG. 5A has one "Action" and one output edge (1701 and 1704 in FIG. 17). The (c) "Action module" is converted into a control flow model and a restoration operation model in the SRN model in accordance with (1) and (2) below.

(1) The "Action module" is converted into "place"s ($P_{execx}$, $P_{returnx}$, and the like), transitions ($t_{gfinishx}$, $t_{gbeforex}$, and the like), and arcs of a control flow model (reference number 5A-F18 (FIG. 18) of FIG. 5A).

(2) The "Action module" is converted into one restoration operation model (reference number 5A-F19 (FIG. 19) in FIG. 5A). In the restoration operation model (FIG. 19), a transition rate $T_{gexecx}$ and a transition probability $t_{tsuccessx}$ are decided in accordance with values of a success rate $r_x$ of a restoration operation and execution time $t_{rx}$ of the restoration operation, which are parameters that are input by a system designer. Note that $r_x$ and $t_{rx}$ are designated in a note for the original AD module of the conversion (FIG. 17).

The control flow model and the restoration operation model in the converted SRN model module interact in the following manner. When a token moves to $P_{execx}$ of the control flow model in the aforementioned (1), in the restoration operation model in the aforementioned (2), $T_{gexecx}$ becomes able to fire. In the restoration operation model, a token of $P_{beforex}$ moves to $P_{branchx}$ at a transition rate of $1/t_2$ [1/h]. Thereafter, $t_{successx}$ fires at a firing probability $p_1$, and the token moves to $P_{finishx}$ via $P_{opx}$. For example, it is assumed that the "Action module" representing a specific operation $op_x$ is associated with a specific "DecisionNode" $d_\psi$ in accordance with an "allocation" having a <<control>> as its stereotype (FIG. 24). In this case, the token of $P_{opx}$ enables a transition $t_{gyes\psi}$ or $t_{gno\psi}$, which is converted from (f) "Control with Condition I" illustrated in FIG. 5B, to fire. On the other hand, when a token is present in $P_{branchx}$, $P_{branchx}$, $t_{failx}$ fires at a transition probability of $1-p_1$. Thereafter, the token moves directly to $P_{finishx}$. When the token is present in $P_{finishx}$, $t_{gfinishx}$ of the control flow model in the aforementioned (1) becomes able to fire, and the token moves to $P_{returnx}$. When the token is present in $P_{returnx}$, the token of the restoration operation model returns again to the first "place" $P_{beforex}$. When the token is present in $P_{beforex}$ in the restoration operation model, $t_{gbeforex}$ of the control flow model fires. The token then moves to a "place" of the next (destination of the transition) SRN model module, converted from the next AD module that is a connection destination in the original activity diagram of the conversion.

The (d) "FlowFinal module" illustrated in FIG. 5B includes one FlowFinal. The "FlowFinal Module" is converted into one "place" of the control flow model illustrated in FIG. 5B (reference number 5B-F21 (2101 in FIG. 21) in FIG. 5B). This "place" is one of the end point(s) of the control flow model. A token being present in this "place" indicates that the failure restoration procedure has ended without complete restoration.

The (e) "ActivityFinal module" illustrated in FIG. 5B includes one ActivityFinal. The "ActivityFinal Module" is converted into one "place" of the control flow model illustrated in FIG. 5B (reference number 5B-F23 (2301 in FIG. 23) in FIG. 5B). This "place" is one of the end point(s) of the control flow model. A token being present in this "place" indicates that the failure restoration procedure has completed with complete restoration.

The (f) "Control with condition module I" illustrated in FIG. 5B includes one "allocation" having a <<control>>, which is the aforementioned stereotype, from an "Action" representing an operation $op_x$, to a "DecisionNode" $d_\theta$. The "Control with condition module I" is converted into one transition, one input arc, and one output arc (reference number 5B-F25 in FIG. 5B, FIG. 25) which connect two "place"s ($P_{yes}$ and $P_{no}$) of a system state model converted from a "DecisionNode module" that includes a conditional branch $d_\theta$, as the system state model illustrated in FIG. 5B. The direction of transition between the respective converted "place"s is regulated from a failure state to a normally functioning state. The direction of transition is decided by a system designer. For example, if the output "yes" from a specific "DecisionNode module" that includes the conditional branch $d_\theta$ corresponds to a failure state, the direction of transition becomes from $P_{yes\Psi}$ to $P_{no\Psi}$. Similarly, if the output "no" of the conditional branch $d_\theta$ corresponds to a failure state, the direction of transition becomes from $P_{no\Psi}$ to $P_{yes\Psi}$. Due to a guard function $g_{opx}$, $t_{gopx}$ fires only when a token is present in $P_{opx}$, and the token moves from $P_{yes\Psi}$ or $P_{no\Psi}$, to $P_{no\Psi}$ or $P_{yes\Psi}$, respectively.

The (g) "Control with condition module II" illustrated in FIG. 5B includes one "allocation" having a <<control>> as the aforementioned stereotype, from a "DecisionNode" $d_\Psi$, to a "DecisionNode" $d_\theta$. The "Control with condition module II" is converted into one transition, one input arc, and one output arc (reference number 5B-F27 in FIG. 5B (FIG. 27)) which connect two "place"s of a system state model converted from a "DecisionNode module" that includes a conditional branch $d_\theta$, as the system state model illustrated in FIG. 5B. The direction of transition is the same as in the (f) "Control with condition module I". Only when a token is present in $P_{yes\Psi}$ or $P_{no\Psi}$, due to a guard function $g_{yes\Psi}$ or $g_{no\Psi}$, $t_{gyes\Psi}$ or $t_{gno\Psi}$ fires, and the token moves from $P_{yes\theta}$ or $P_{no\theta}$, to $P_{no\theta}$ or $P_{yes\theta}$, respectively.

The (h) "Prior module" illustrated in FIG. 5B includes one "allocation" having a <<prior>> as the aforementioned stereotype, from an "Action" that has an operation $op_x$, to an "Action" that has an operation $op_y$. The "Prior module" is converted into one intermediate place between two places of a system state model converted from a "DecisionNode module" that includes a conditional branch $d_\theta$, and is converted into two transitions, two input arcs, and two output arcs that connect the three places mutually (reference number 5B-F29 in FIG. 5B (FIG. 29)), as the system state model illustrated in FIG. 5B. The direction of transition is the same as in the (f) "Control with condition module I". Only when a token moves to $P_{opx}$ and, thereafter, the token moves to $P_{opy}$, due to the guard function $g_{opx}$ or $g_{opy}$, the token moves from $P_{yes\theta}$ or $P_{no\theta}$, to $P_{no\theta}$ or $P_{yes\theta}$, respectively.

Note that, although conversion rules for other nodes or "allocation"s are omitted, expansion specialized for a specific system can be easily implemented by adding a new conversion rule as required.

Figure 7:
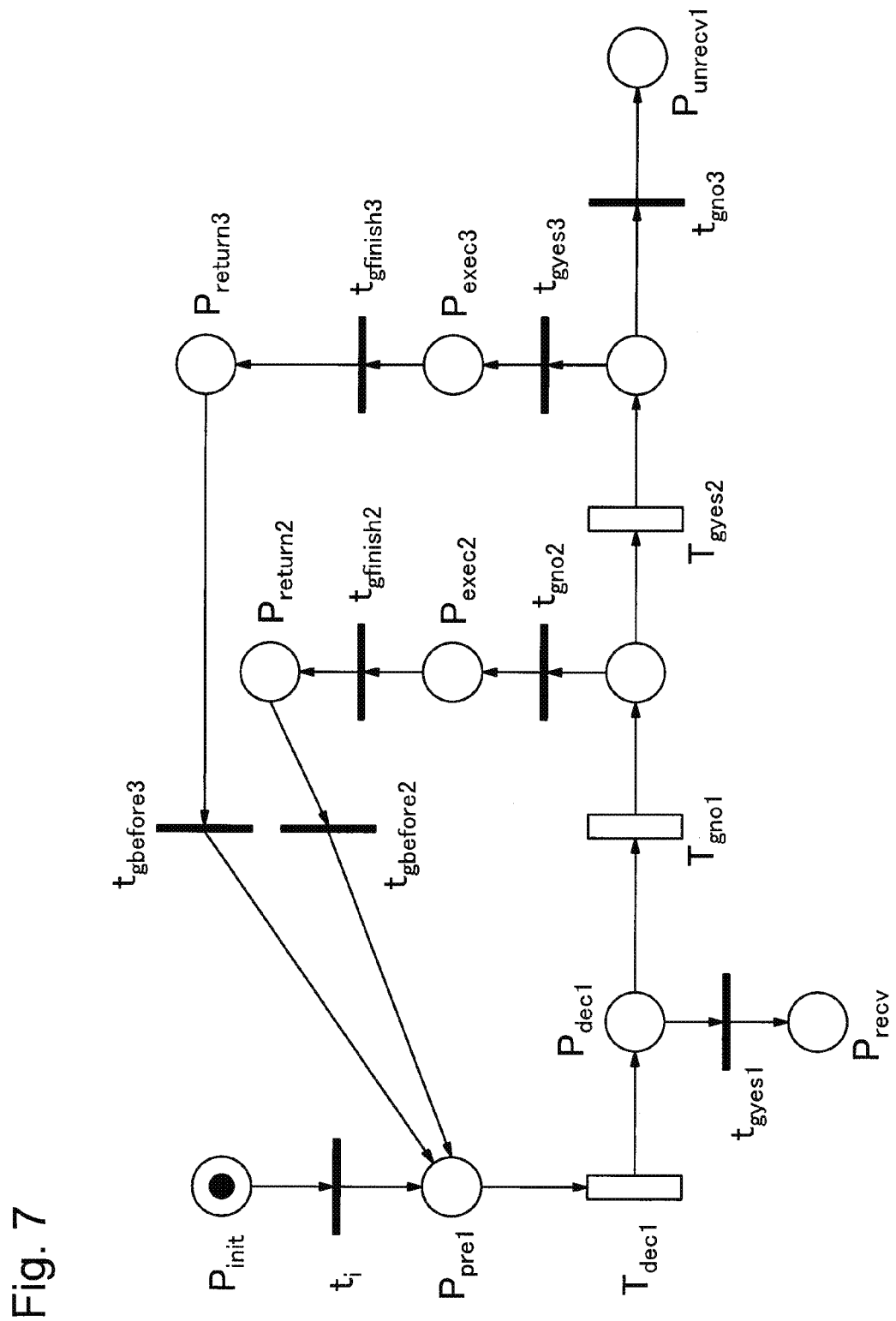
FIG. 7 is a diagram illustrating an example of a control flow model, which is a part of an analysis model generated from the failure restoration procedure, according to the 2nd exemplary embodiment of the present invention.

FIG. 7 is a diagram illustrating an example of a control flow model that is a part of an analysis model generated from the failure restoration procedure illustrated in FIG. 6.

Figure 8:
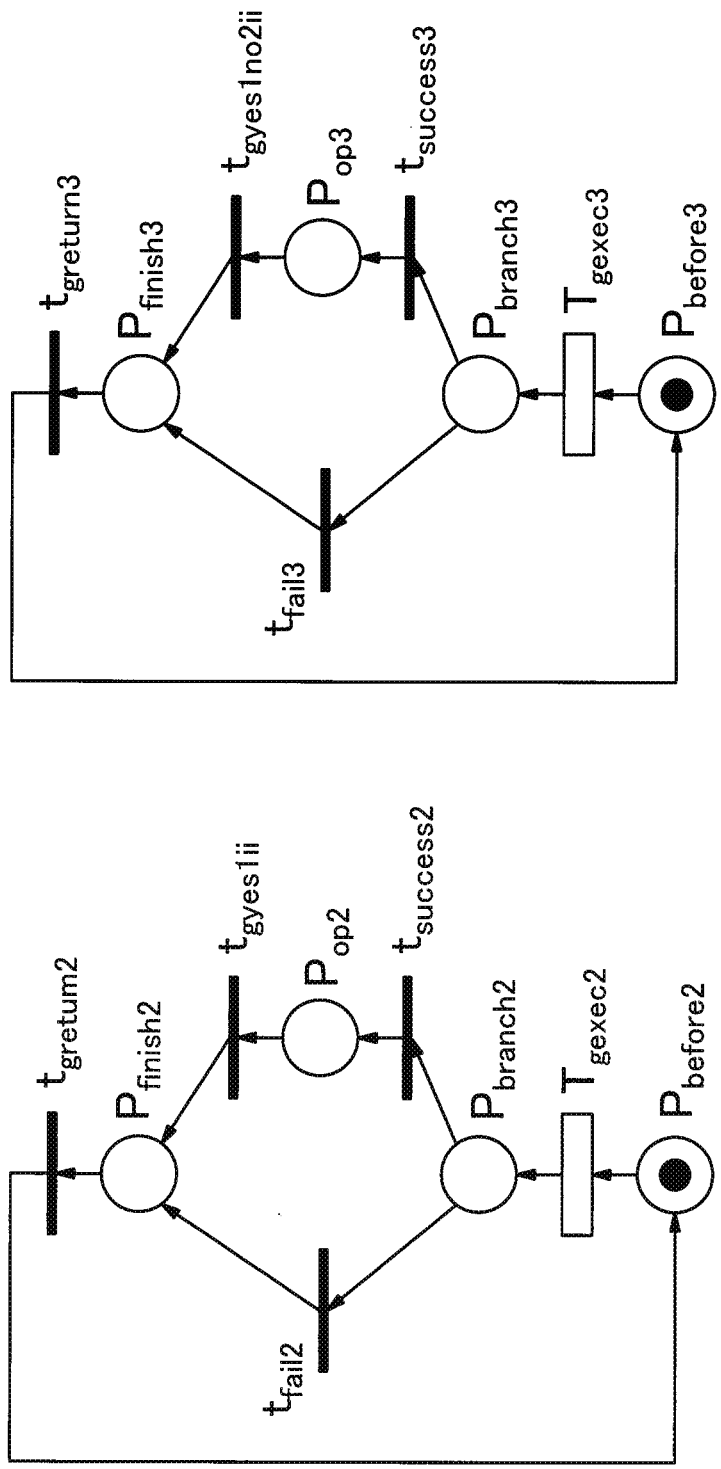
FIG. 8 is a diagram illustrating an example of a restoration operation model, which is a part of the analysis model generated from the failure restoration procedure, according to the 2nd exemplary embodiment of the present invention.

FIG. 8 is a diagram illustrating an example of a restoration procedure model that is a part of the analysis model generated from the failure restoration procedure illustrated in FIG. 6.

Figure 9:
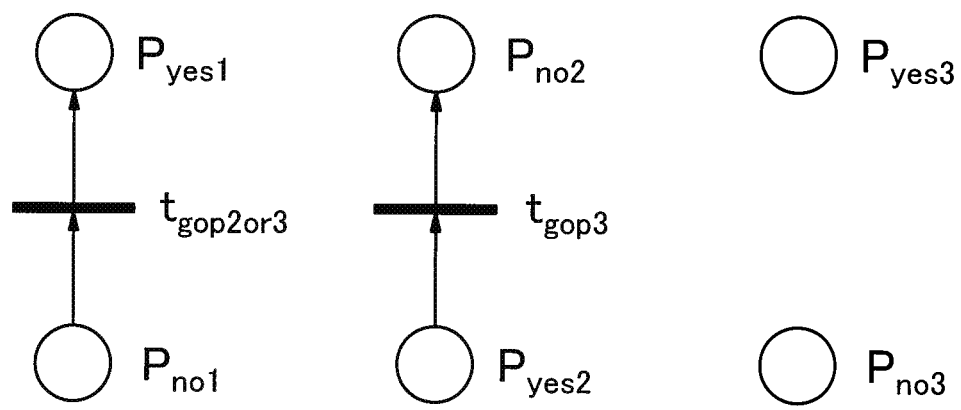
FIG. 9 is a diagram illustrating an example of a system state model, which is a part of the analysis model generated from the failure restoration procedure, according to the 2nd exemplary embodiment of the present invention.

FIG. 9 is a diagram illustrating an example of a system state model that is a part of the analysis model generated from the failure restoration procedure illustrated in FIG. 6.

The subsequent processing in the system design apparatus 1, that is, the processing procedure of steps S1030 to S1070 illustrated in FIG. 4, is the same as the procedure illustrated in FIG. 2 in the 1st exemplary embodiment. In other words, a description thereof in the present exemplary embodiment is omitted since it is sufficient to carry out steps S1030 to S1070 of the same procedure illustrated in FIG. 2.

Effect According to 2nd Exemplary Embodiment

As described hereinabove, owing to the system design apparatus according to the 2nd exemplary embodiment of the present invention, an action and an effect that are the same as in the system design apparatus 1 according to the 1st exemplary embodiment can be achieved.

In addition, owing to the system design apparatus 1 according to the 2nd exemplary embodiment of the present invention, an analysis model in accordance with an SRN model can be automatically generated from an activity diagram created by a system designer. Therefore, a system designer who does not have specialist knowledge of the mathematical modeling necessary for a model-based evaluation method can also evaluate, for example, possibility of restoration requirements being fulfilled, with regard to a failure restoration procedure designed using an activity diagram or the like.

3rd Exemplary Embodiment

Next, a system design apparatus according to a 3rd exemplary embodiment of the present invention is described. With regard to component failures, when restoration time and cost for all combinations of failures that may occur are calculated, the amount of computation for analysis rapidly increases as the number of components increases. Thus, it is desirable for the amount of computation to be reduced by pruning the combinations of component failures to be analyzed.

The system design apparatus according to the 3rd exemplary embodiment of the present invention further includes, with respect to the system design apparatus according to the aforementioned 1st and 2nd exemplary embodiments, a configuration that prunes a combination of component failures to be analyzed. Hereinafter, this configuration is mainly described.

(Function)

Figure 10:
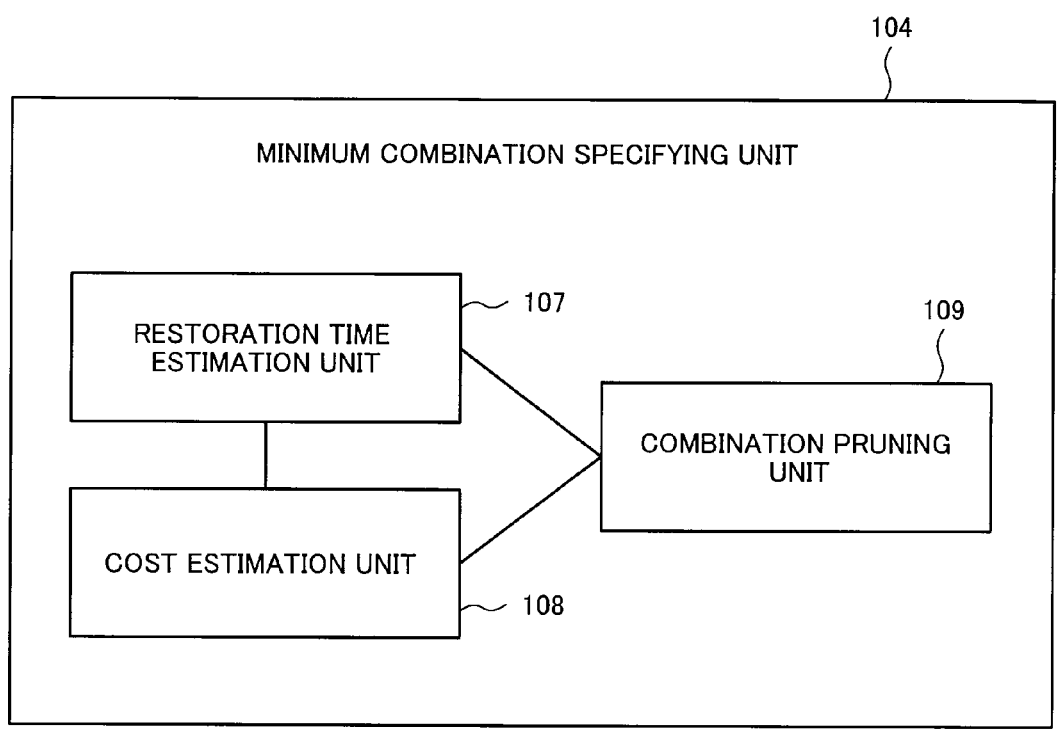
FIG. 10 is a block diagram schematically illustrating a system design apparatus, according to a 3rd exemplary embodiment of the present invention.

As illustrated in FIG. 10, functions of a system design apparatus 1 according to the 3rd exemplary embodiment include a combination pruning unit 109 in the minimum combination specifying unit 104, in addition to the functions of the system design apparatus 1 according to the 1st or 2nd exemplary embodiment. The configuration other than this is the same as in the aforementioned exemplary embodiments, thus a description thereof in the present exemplary embodiment is omitted.

(Operation)

Next, an operation of the aforementioned system design apparatus 1 is described with reference to FIG. 11. First, the system design apparatus 1 in the present exemplary embodiment, for example, carries out steps S1010 to S1020 illustrated in FIG. 4, in the same way as in the 2nd exemplary embodiment.

Figure 11:
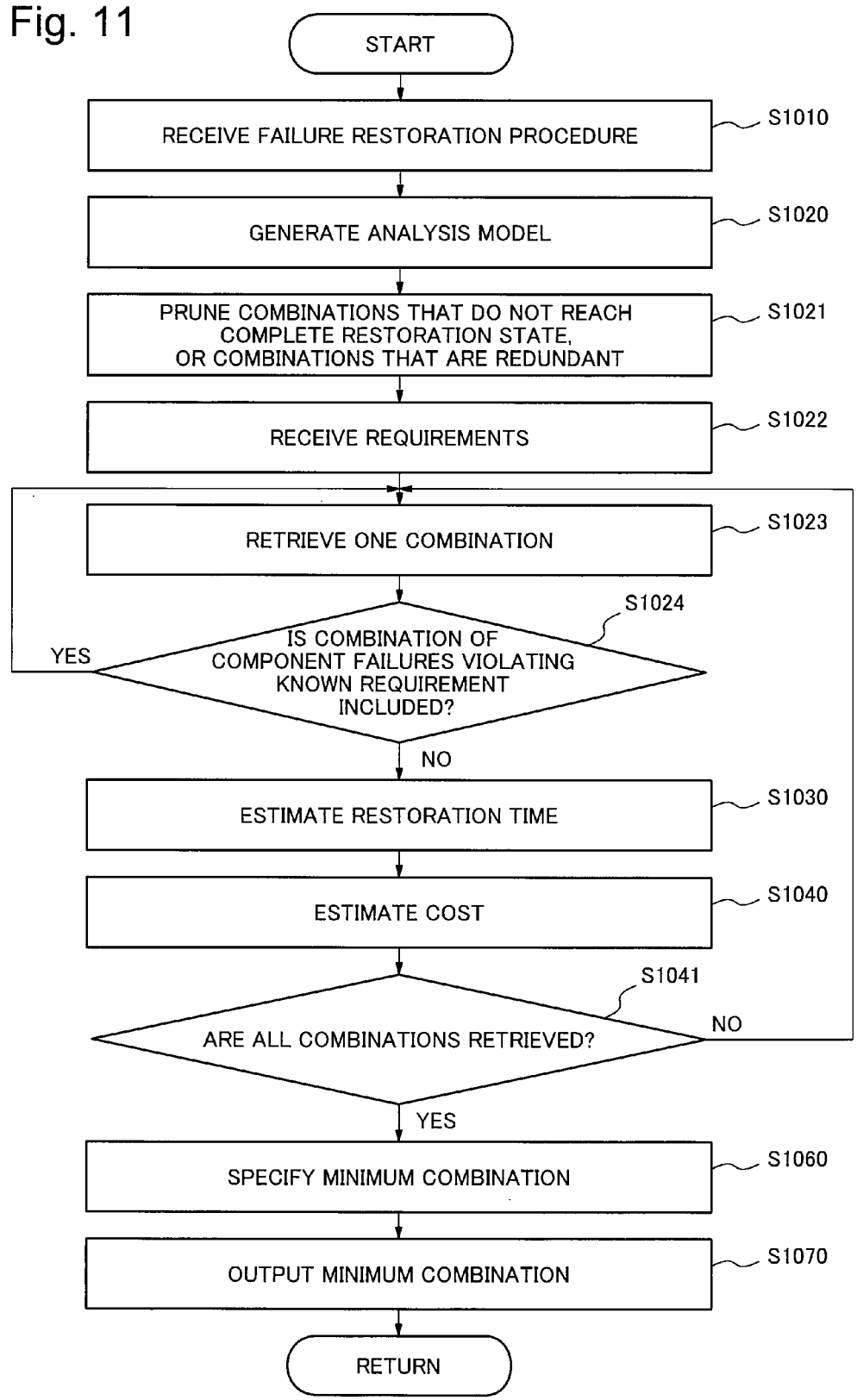
FIG. 11 is a flowchart illustrating an overview of the operation of the system design apparatus, according to the 3rd exemplary embodiment of the present invention.

Next, the system design apparatus 1 prunes combinations of component failures to be analyzed (step S1021 illustrated in FIG. 11). Hereinafter, a specific pruning method in step S1021 is described.

First, in an activity diagram that is input in step S1010, a combination of component failures leading to the FlowFinal does not reach a complete system restoration state. Therefore, this kind of combination is excluded from target of analysis.

Next, when failure restoration procedures for different combinations of component failures are the same, only the first one of them is analyzed so that repetition of analysis is eliminated. For example, when a failure occurs in a physical server, an OS (operating system) running on the physical server has to be restored after the physical server is restored, regardless of whether or not a failure occurs in the OS itself. As another example, when a component is operating normally but a backup file for the component is corrupted, immediate restoration of the backup file is desirable. However, this restoration of the backup is not essential when the entire system is restored.

Next, the system design apparatus 1 receives restoration time and cost requirements, in the same way as in step S1050 in the 2nd exemplary embodiment (step S1022 illustrated in FIG. 11).

Next, the system design apparatus 1 retrieves one combination of component failures among combinations in which the number of included component failures is the lowest (step S1023 illustrated in FIG. 11). At this time, the system design apparatus 1 selects a combination of component failures among combinations that are not yet retrieved and in which the number of included component failures is the lowest (it is assumed that a combination retrieved once is not retrieved again).

At this time, when the one retrieved combination includes a combination of component failures that does not satisfy restoration time and cost requirements and violates a known requirement, the system design apparatus 1 excludes the combination from target of analysis. The system design apparatus 1 then returns to step S1023 (when "yes" in step S1024 illustrated in FIG. 11). The reason for this is that the number of included component failures in the combination becomes greater than the minimum combination, and therefore, the combination cannot become a minimum combination. On the other hand, in a case other than the above, processing advances to step S1030 (when "no" in step S1024 illustrated in FIG. 11).

Next, in the same way as in the 2nd exemplary embodiment, the system design apparatus 1 carries out steps 1030 to 1040 for the retrieved combination.

Next, when all of the combinations are retrieved, processing advances to step S1060 (when "yes" in step S1041 illustrated in FIG. 11), and steps S1060 to S1070 are carried out, in the same way as in the 2nd exemplary embodiment. On the other hand, when "no" in step S1041 illustrated in FIG. 11, processing returns to step S1023, and processing is continued.

Effect of 3rd Exemplary Embodiment

As described hereinabove, owing to the system design apparatus according to the 3rd exemplary embodiment of the present invention, an action and an effect that are the same as in the system design apparatus 1 according to the 1st and 2nd exemplary embodiments can be achieved. In addition, owing to the system design apparatus 1 according to the 3rd exemplary embodiment of the present invention, the amount of computation required for analysis is reduced by pruning component combinations.

Hereinabove, the invention of the present application has been described with reference to exemplary embodiments; however, the invention of the present application is not limited to the aforementioned exemplary embodiments. It is possible for various alterations or improvements that are comprehensible to a person skilled in the art to be added, within the technical scope of the invention of the present application, with regard to configurations of the invention of the present application exemplified in the related exemplary embodiments. In such a case, a new exemplary embodiment to which the alteration or improvement has been added may also be included within the technical scope of the present invention.

Note that, although restoration time and cost have been used as evaluation criteria in the respective exemplary embodiments, evaluation criteria regarding another system requirement may be used.

Furthermore, in the respective exemplary embodiments, the restoration time is defined as the time from a system having a failure to the system completely restoring, however, for example, the failure restoration time may be the time for restoring only an important portion of the system.

Furthermore, in the respective exemplary embodiments, when there are a plurality of minimum combination of component failures, the plurality of minimum combinations may be ranked when the minimum combinations are output. For example, each combination may be ranked depending on the exceeding degree of requirements of the failure restoration time or necessary cost. Furthermore, a weighting may be given to each component failure, and each combination may be ranked depending on a total weighting.

Furthermore, in the respective exemplary embodiments, each function of the system design apparatus 1 is realized by a CPU executing a program (software), however, each function may be realized by a hardware apparatus such as a dedicated circuit.

Furthermore, in the respective exemplary embodiments, a program is stored in a storage apparatus, however, the program may be stored in a computer-readable recording medium. For example, the recording medium is a portable medium such as a flexible disk, an optical disc, a magneto-optical disk, and a semiconductor memory.

Furthermore, an arbitrary combination of the aforementioned exemplary embodiments and modified examples may be adopted as another modified example of the exemplary embodiments.

INDUSTRIAL APPLICABILITY

The present invention is suitable for application in a system design apparatus or the like that supports design of a system for failure restoration of an information processing system.

REFERENCE SIGNS LIST

1 System design apparatus
100 Analysis model receiving unit
101 Failure restoration procedure receiving unit
102 Analysis model generation unit
103 Model module
104 Minimum combination specifying unit
105 Requirement receiving unit
106 Minimum combination output unit
107 Restoration time estimation unit
108 Cost estimation unit
109 Combination pruning unit

What is claimed is:

1. A system design apparatus, comprising:
a processor and a memory storing therein a program, wherein the processor is configured to execute the program and thereby implement:
an analysis model receiving unit that is configured to receive an analysis model that represents a failure restoration procedure for a system;
a minimum combination specifying unit that is configured to specify a minimum combination of component failures that does not satisfy a restoration time or a necessary cost requirement, from the analysis model; and
a minimum combination output unit that is configured to output the minimum combination of component failures,
wherein the minimum combination specifying unit comprises:
a restoration time estimation unit that is configured to estimate the restoration time of the system; and
a cost estimation unit that is configured to estimate the necessary cost requirement for restoration of the system;
and
wherein the analysis model is a state transition model in which a state transition occurs based on a specific probability distribution.

2. The system design apparatus, according to claim 1, wherein the processor is further configured to implement:
a failure restoration procedure receiving unit that is configured to receive the failure restoration procedure for the system; and
an analysis model generation unit that is configured to combine model modules to generate a combined analysis model from the failure restoration procedure, wherein
the minimum combination specifying unit is further configured to specify the minimum combination of component failures that does not satisfy the restoration time or the necessary cost requirement, from the combined analysis model.

3. The system design apparatus according to claim 2, wherein the processor is further configured to implement:
a combination pruning unit that prunes a combination of component failures that is not necessary for analysis.

4. The system design apparatus according to claim 2, wherein
the failure restoration procedure includes, at least, information relating to a state of a component in which a failure occurs, information relating to a failure restoration operation for restoring a component in which the failure occurs, or information relating to a condition under which the failure restoration operation is executed, and
the analysis model generation unit is further configured to convert the information relating to the state of the component, the information relating to the failure restoration operation, and the information relating to the condition under which the failure restoration operation is executed, included in the failure restoration procedure, into elements configuring the analysis model, based on a predetermined rule for conversion between the failure restoration procedure and the analysis model, and
integrate the converted elements configuring the analysis model, to generate the analysis model.

5. The system design apparatus according to claim 1, wherein the processor is further configured to implement:
a requirement receiving unit that is configured to receive requirements for the restoration time and the necessary cost requirement for restoration, relating to failure restoration of the system,
wherein the minimum combination specifying unit is further configured to
generate an estimated restoration time of the system and generate an estimated necessary cost requirement for restoration of the system, based on the analysis model, and
specify the minimum combination of component failures that does not satisfy the restoration time or the necessary cost requirement, based on the requirements for the restoration time and the necessary cost requirement for restoration, and based on the estimated restoration time and estimated necessary cost requirement for restoration.

6. A system design method comprising:
receiving an analysis model that represents a failure restoration procedure for a system,
specifying a minimum combination of component failures that does not satisfy a restoration time or a necessary cost requirement, from the analysis model, and
outputting the minimum combination of component failures,
wherein, when the minimum combination of component failures is specified,
generating an estimated restoration time of the system, and
generating an estimated necessary cost requirement for restoration of the system,
wherein the analysis model is a state transition model in which a state transition occurs based on a specific probability distribution.

7. The system design method according to claim 6, further comprising:
receiving requirements for the restoration time and the necessary cost requirement for restoration, relating to failure restoration of the system, and
specifying the minimum combination of component failures that does not satisfy the restoration time or the necessary cost requirement, based on the requirements for the restoration time and the necessary cost requirement for restoration, and based on the estimated restoration time and the estimated necessary cost requirement for restoration.

8. A non-transitory computer readable medium recorded with a system design program for causing an information processing apparatus to function as:
an analysis model receiving unit that is configured to receive an analysis model that represents a failure restoration procedure for a system;
a minimum combination specifying unit that is configured to specify a minimum combination of component failures that does not satisfy a restoration time or a necessary cost requirement, from the analysis model; and
a minimum combination output unit that is configured to output the minimum combination of component failures,
wherein the minimum combination specifying unit comprises:
a restoration time estimation unit that is configured to estimate a restoration time of the system; and a cost estimation unit that is configured to estimate a necessary cost requirement for restoration of the system, wherein the analysis model is a state transition model in which a state transition occurs based on a specific probability distribution.

9. The non-transitory computer readable medium recorded with the system design program according to claim 8, the system design program further causing the information processing apparatus to function as:

a requirement receiving unit that is configured to receive requirements for the restoration time and the necessary cost requirement for restoration, relating to failure restoration of the system;

wherein the minimum combination specifying unit is further configured to estimate generate an estimated restoration time of the system and an estimated necessary cost requirement for restoration of the system, based on the analysis model, and specify the minimum combination of component failures that does not satisfy the restoration time or the necessary cost requirement, based on the requirements for restoration time and the necessary cost requirement for restoration, and based on the estimated restoration time and estimated necessary cost requirement for restoration.

\* \* \* \* \*